United States Patent [19]
Hendrix

[11] Patent Number: 6,115,927
[45] Date of Patent: Sep. 12, 2000

[54] MEASURING DEVICE PRIMARILY FOR USE WITH VEHICLES

[75] Inventor: Bill Hendrix, Central City, Ky.

[73] Assignee: Brewco, Inc., Central City, Ky.

[21] Appl. No.: 09/029,139
[22] PCT Filed: Sep. 15, 1997
[86] PCT No.: PCT/US97/16399
§ 371 Date: Mar. 9, 1998
§ 102(e) Date: Mar. 9, 1998
[87] PCT Pub. No.: WO98/11405
PCT Pub. Date: Mar. 19, 1998

Related U.S. Application Data
[60] Provisional application No. 60/026,195, Sep. 16, 1996.

[51] Int. Cl.⁷ ..................................................... G01B 5/24
[52] U.S. Cl. ............................. 33/288; 382/152; 348/135
[58] Field of Search .............................. 33/288, 286, 608, 33/600; 382/152, 153, 154, 287, 291, 209, 217, 218; 348/135; 702/150, 151, 152, 153

[56] References Cited

U.S. PATENT DOCUMENTS

| | | |
|---|---|---|
| 4,598,481 | 7/1986 | Donahue . |
| 4,639,878 | 1/1987 | Day et al. . |
| 4,689,888 | 9/1987 | Aldrich et al. . |
| 4,691,443 | 9/1987 | Hamilton et al. . |
| 4,731,936 | 3/1988 | Aldrich et al. . |
| 4,811,250 | 3/1989 | Steber et al. . |
| 4,922,623 | 5/1990 | Aldrich et al. . |
| 5,029,397 | 7/1991 | Palombi . |
| 5,164,995 | 11/1992 | Brooks et al. ........................... 382/152 |
| 5,207,002 | 5/1993 | Humblet . |
| 5,305,091 | 4/1994 | Gelbart et al. . |
| 5,383,454 | 1/1995 | Bucholz . |
| 5,475,613 | 12/1995 | Itoga et al. .............................. 348/135 |
| 5,483,604 | 1/1996 | Salisbury ................................ 382/152 |
| 5,515,613 | 5/1996 | Hinson . |
| 5,617,857 | 4/1997 | Chader et al. . |
| 5,622,170 | 4/1997 | Schulz . |
| 5,638,116 | 6/1997 | Shimoura et al. ....................... 348/135 |
| 5,646,682 | 7/1997 | Sogabe et al. .......................... 348/135 |
| 5,790,400 | 8/1998 | Higuchi .................................. 382/152 |
| 5,887,083 | 3/1999 | Sumi et al. ............................. 382/154 |
| 5,915,033 | 6/1999 | Tanigawa et al. ...................... 382/154 |
| 5,946,424 | 8/1999 | Oshima .................................. 382/154 |

FOREIGN PATENT DOCUMENTS

| | | |
|---|---|---|
| 0358003A2 | 8/1989 | European Pat. Off. . |
| 0358003A3 | 8/1989 | European Pat. Off. . |
| 2615343 | 11/1988 | France . |
| 4327937A1 | 2/1995 | Germany . |
| WO94/23647 | 10/1994 | WIPO . |

*Primary Examiner*—G. Bradley Bennett
*Assistant Examiner*—Maria Fernandez

[57] ABSTRACT

A system for measuring the points on a vehicle includes reference emitters fixed relative to the vehicle, electromagnetic radiation-emitting probes, a camera, and a computer. The camera senses the direction of the emitter from three different locations so the computer can triangulate to determine the position of the emitter. The position is then put onto a standard coordinate system and is compared to standard data for the type of vehicle to determine the extent of deviation of the measured point from the standard data. This provides real time data to a person who is straightening the vehicle or aligning parts of the vehicle to know when the straightening or aligning is complete.

15 Claims, 23 Drawing Sheets

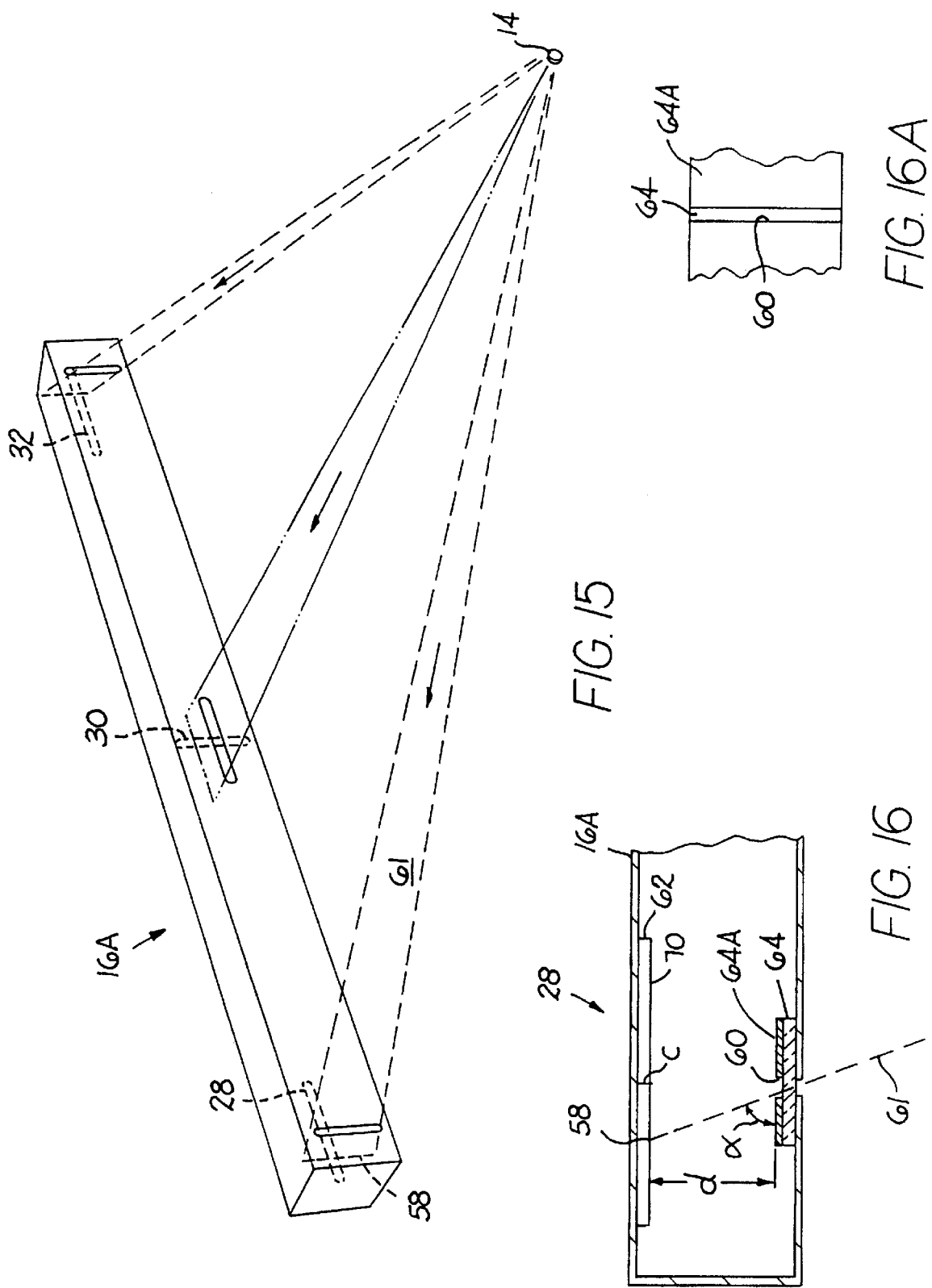

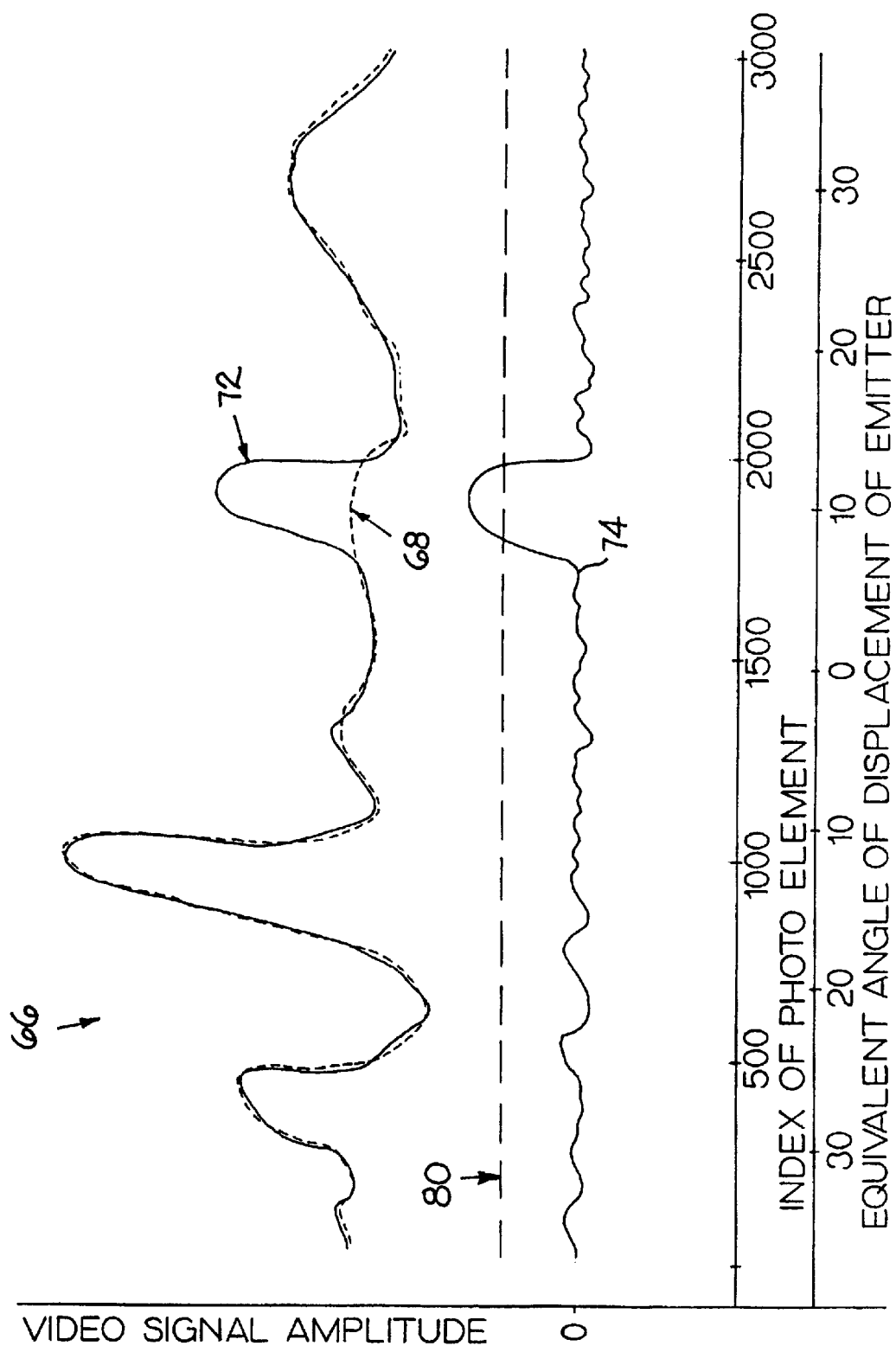

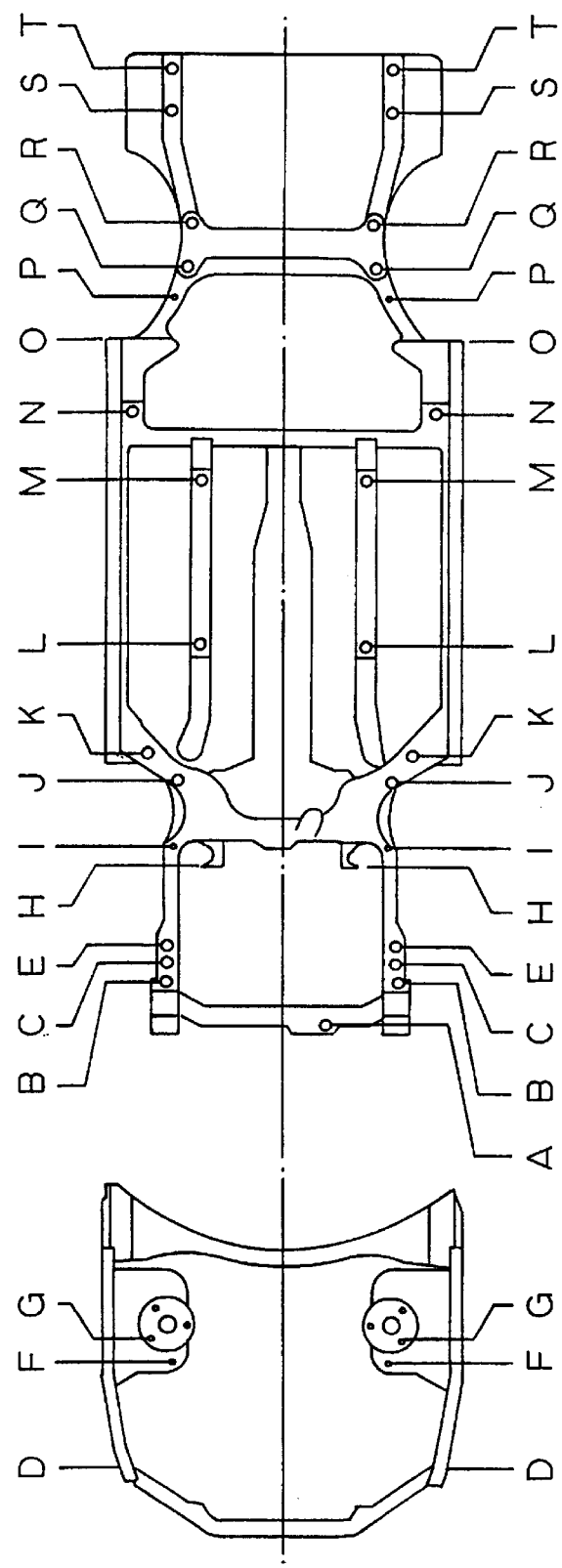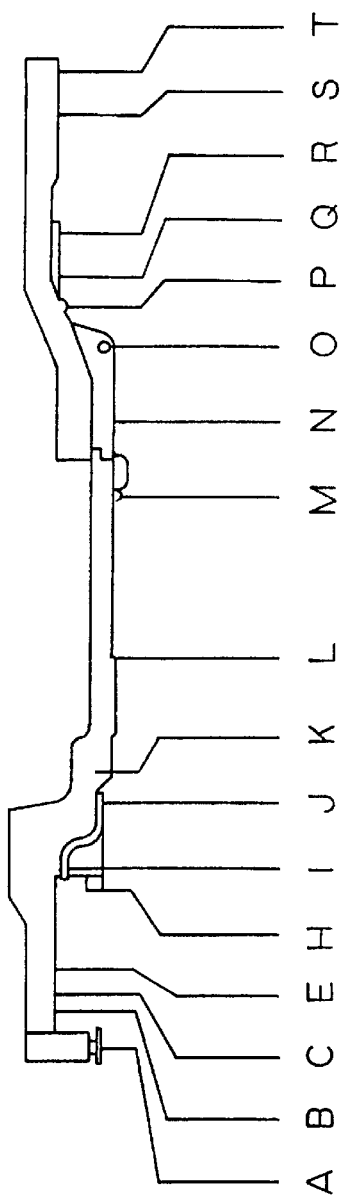
FIG. 19

FIG. 23

COMPARATIVE MEASUREMENTS OF ENGINE COMPARTMENT AND DOME

| POINT | WIDTH | LENGTH | HEIGHT | POINT | WIDTH | LENGTH | HEIGHT | DISTANCE |
|---|---|---|---|---|---|---|---|---|
| 1. | 472 | 736 | 712 | 2. | 480 | 248 | 641 | (a) 1072 |
| 3. | 471 | 734 | 713 | 4. | 481 | 247 | 641 | (b) 1072 |
| 5. | 557 | 1999 | 1120 | 6. | 556 | 2002 | 1124 | (d) 1113 |

MEASURING DEVICE PRIMARILY FOR USE WITH VEHICLES

BACKGROUND OF THE INVENTION

This application claims priority from U.S. Provisional Application S.N. 60/026,195, filed Sep. 16, 1996. The present invention relates to measuring systems for vehicles.

Many measuring devices have been used on vehicles in the past to try to determine how much a vehicle frame needs to be straightened after an accident or to determine how to align the wheels or other portions of the vehicle. Mechanical measuring devices have been difficult to use. They require a user who is well-trained, take a lot of time to use, and are not as accurate as is desired. Other devices use sound waves and measure the time lapse from the time the sound is emitted to the time it reaches a plurality of sensors to determine the locations of points on the vehicle. These systems have many problems with extraneous noises from air hoses and other devices in a shop interfering with the readings of the sensors. They also have accuracy problems, because the speed at which the sound travels depends upon the weather and upon the speed at which air is moving through the shop. Other devices use targets that are mounted on the vehicle and scan the vehicle with lasers or other light to determine the locations of the targets. These systems require that all the targets be located on the same plane, which again is very cumbersome and time consuming. Up to now, there has been no system for measuring misalignment or the extent to which a measurement deviates from a standard, which is both accurate and easy to use.

U.S. Pat. No. 5,622,170 issued to Schulz describes a measuring system that is used in the medical field to track the location of a probe inside a patient during invasive surgery. While that system is not suited to measuring deviations of vehicles from a standard, it has several features similar to those of the present invention, and that patent is hereby incorporated herein by reference.

SUMMARY OF THE INVENTION

The present invention provides a system which solves many of the problems of prior art vehicle measurement systems. It is quick and easy to use, requires very little training on the part of the user, and is very accurate. The system also provides information to the user essentially in real time, so that, as a user is straightening the frame or aligning wheels or other parts of a vehicle, he can watch the deviation from the standard decrease, until the vehicle measurement is aligned with the standard.

One important advantage of the present invention over other vehicle measurement systems is that the user can measure any point on the vehicle, including any point on the upper body of the vehicle, simply by touching that point with a probe. It is not necessary to build elaborate frameworks to bring the measured point down to some datum plane as in prior art systems.

The present invention uses electromagnetic radiation emitters, which are fixed relative to the vehicle, a movable probe having electromagnetic radiation emitters, and a camera including a plurality of electromagnetic radiation sensors, to measure the vehicle. A computer controls the emitters, receives data from the sensors, calculates the positions of the emitters relative to the sensors, and relates those positions to a stored, standard coordinate system for the vehicle, comparing the measured points to stored, standard data for the vehicle.

The camera may be moved around the vehicle to measure points at various locations on the vehicle. This is a great improvement over prior systems, in which all the points to be measured must be sensed from the sensor in a single position. Whenever the camera moves to a new position, it must be able to "see" some points of known position from the same position that it measures new points, so that the computer can relate the positions of the new points back to the known coordinate system.

The sensors are preferably mounted on a single boom or camera, so that their relative positions remain constant. There are slits in front of the sensors, so that each sensor receives a plane of electromagnetic radiation, from which the angle from the emitter to the sensor can be determined. With three sensors determining three intersecting planes, the point of intersection of the three planes is the location of the emitter relative to the camera. This process may be referred to as triangulation.

The emitters are preferably strobed or time multiplexed so that only one emitter is on and is sensed at a time. The computer controls the strobing and receives data from the sensors, and, since it knows the timing of the strobing, it knows which emitter's data is being received. The strobing occurs very rapidly, so that, in effect, the user obtains real time data while the vehicle is being straightened or aligned.

The computer includes a touch screen user interface, and, when measurements are being taken, the screen shows the deviations of measured points from the standard. The deviations are shown both graphically and numerically, with a vector line extending from a drawing showing each standard point being measured. The vector extends in the direction of the deviation and has a length corresponding to the amount of deviation. Thus, the user can simply look at the screen to see the exact direction the point needs to move in order to obtain proper alignment, and the user has a visual indication of the extent of movement necessary to obtain alignment. The vector lines move as the vehicle is being straightened, so the user can watch the vector lines shrink and disappear as the vehicle becomes aligned.

The reference emitters should be pointed in different directions so that the camera can always "see" a plurality of reference emitters as it is moved around the vehicle to measure various points on the vehicle. The reference emitters may be located on probes mounted on the vehicle, may be attached directly to the vehicle, or may be on a frame which is fixed relative to the vehicle.

In an alternative embodiment, the camera is fixed relative to the vehicle in a position from which it can "see" all the points to be measured.

BRIEF DESCRIPTION OF THE DRAWINGS

FIG. 15 is a schematic view of the camera of FIG. 4A receiving radiation from an emitter;

FIG. 16 is a broken-away top sectional view of the left end of the camera of FIG. 15;

FIG. 16A is a rear view of the coated band pass filter of FIG. 16;

FIG. 17 is a graph showing the signal produced by the camera when an emitter is on, the signal produced by the camera when all emitters are off, and the signal which is formed by subtracting the two previous signals, resulting in eliminating most of the ambient noise;

FIG. 19 is a view of the touch screen of FIG. 2 that a user would see after selecting a vehicle;

FIG. 23 is a chart showing the comparative measurements that are taken by the user in FIG. 22.

DESCRIPTION OF THE PREFERRED EMBODIMENTS

Figure 1:
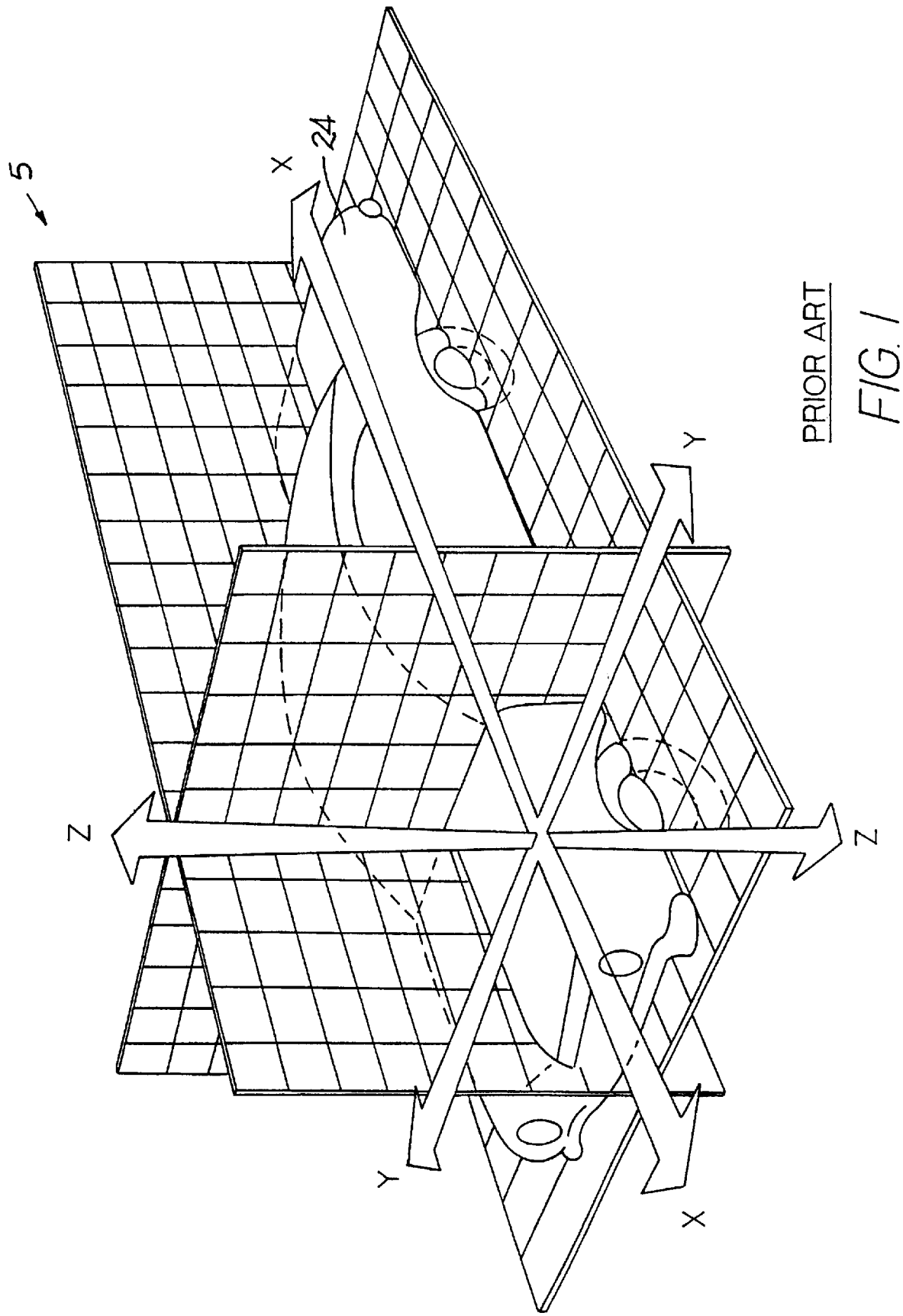
FIG. 1 is a perspective view of a standard coordinate system for a vehicle, taken from SAE J1828.

FIG. 1 shows a standard reference coordinate system 5 for a vehicle in accordance with SAE J1828. This coordinate system 5 is well-known in the art and is used by vehicle manufacturers and others who provide standard measurement data for vehicles. The coordinate system includes three orthogonal datum planes X, Y, and Z. The Y plane is a vertical plane which bisects the automobile from front to back. The X plane is a vertical plane through the approximate center of the vehicle, and the Z plane is a horizontal plane through the approximate center of the vehicle. Stored data for the vehicle indicate the X,Y,Z coordinates for many known points on the vehicle. Since the vehicle is symmetrical, corresponding points on the left and right sides of the vehicle will have the identical coordinates except that the Y coordinate of the point on the left side will be the negative of the corresponding point on the right side. Vehicles have several reference holes, reference bolts, and other reference points at which standard coordinate data may be provided and stored in the system. This standard data preferably is supplied by the vehicle manufacturer or by a third party. Alternatively, the user may establish his own standard data by measuring an undamaged or properly aligned vehicle with the system of the present invention or by some other means and storing that data before measuring a damaged or misaligned vehicle.

In order to describe the measuring system of the present invention, first the parts of the system and their individual functions will be described, and then it will be explained how the system as a whole is used to measure a vehicle. The basic system includes a computer, a touch screen, which serves as a user interface, a keyboard, which also serves as a user interface, a camera, and a plurality of electromagnetic radiation emitters, which are sensed by the camera.

Figure 2:
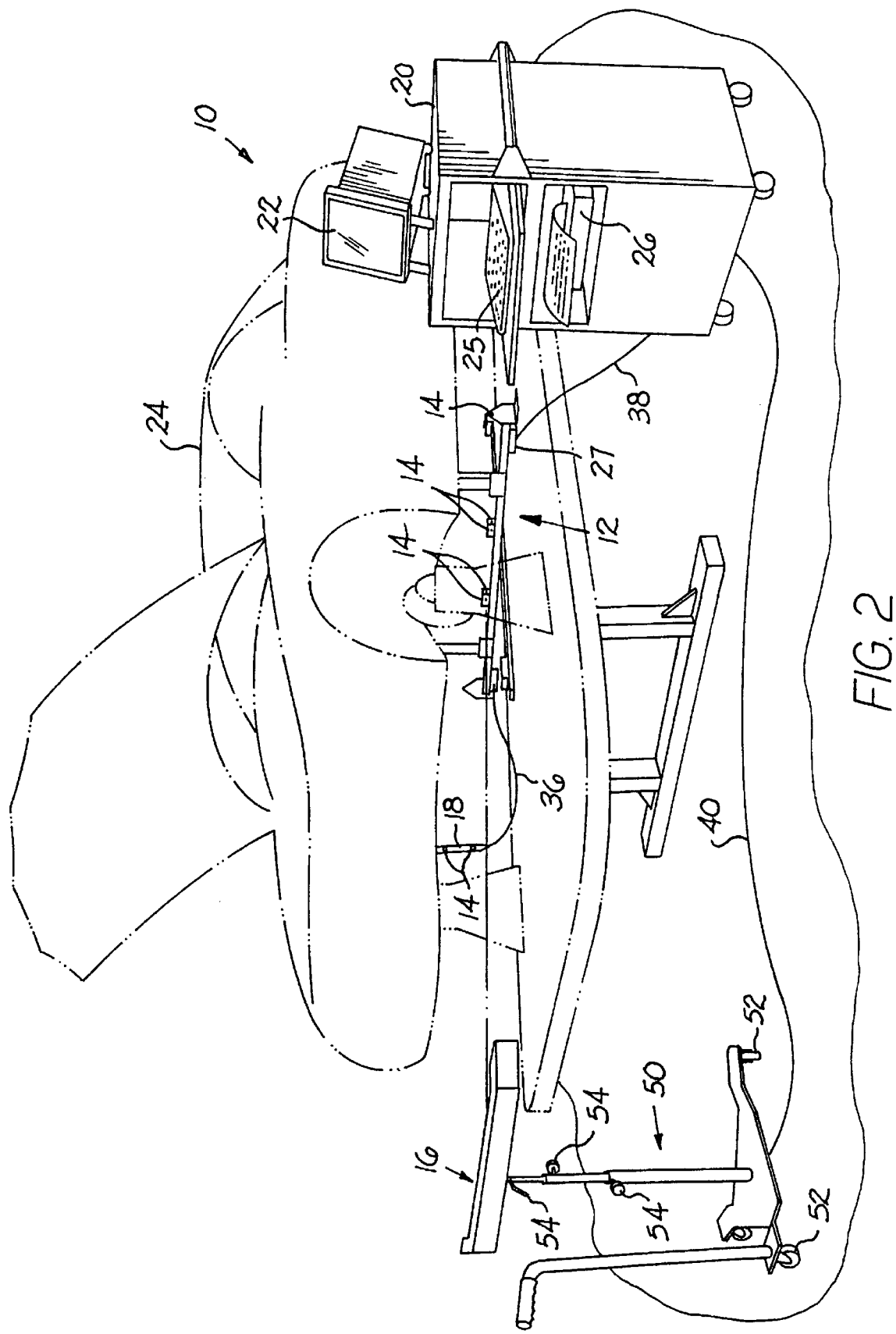
FIG. 2 is a perspective view of a preferred embodiment of the present invention.
Figure 2A:
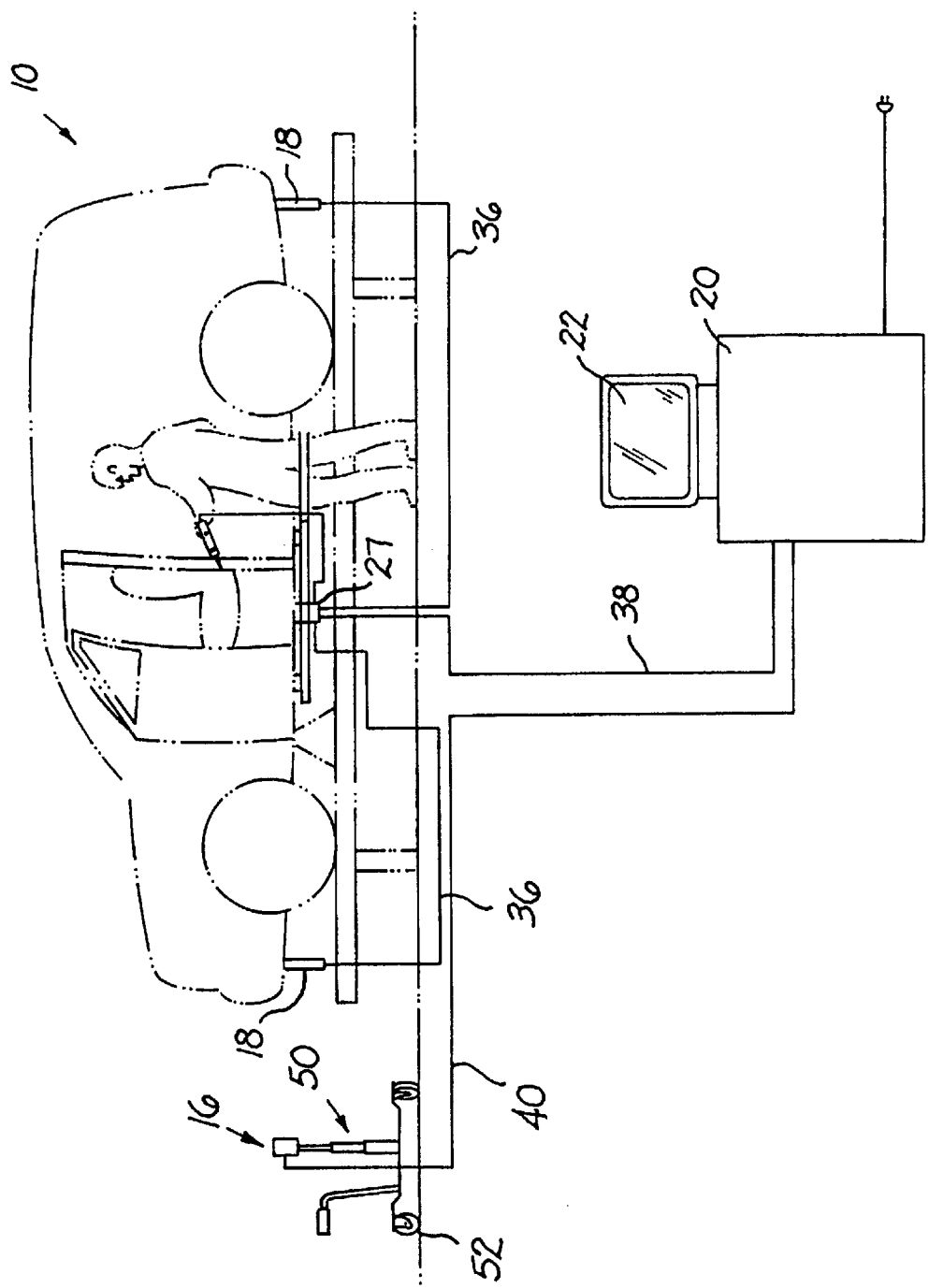
FIG. 2A is a side view of the embodiment of FIG. 1, showing the connection of the individual components of the measuring system to the central computer.

FIGS. 2 and 2A show a preferred embodiment of the basic measuring system 10 of the present invention. A reference frame 12 is fixed relative to a portion of the vehicle that will not move during the alignment process. The reference frame 12 does not have to be mounted at any particular position or in any particular orientation. It is preferably mounted to the pinch weld of the vehicle by means of clamps 13 (shown in FIGS. 3 and 3A), but it could simply rest on the hood of the vehicle, could be pinned or bolted onto the vehicle, or could be fixed relative to the vehicle by other known methods. FIG. 3B shows an adapter 13A that can be used for a vehicle that does not have a pinch weld. This adapter is magnetic and will attach magnetically to the frame or other part of the vehicle. The clamps 13 can then be used to clamp onto two of these adapters. The reference frame 12 includes a plurality of electromagnetic radiation emitters 14, pointed in several different directions, so that it can be "seen" by the camera 16 as it is moved around the vehicle to take readings. The camera 16 (shown in more detail in FIG. 4) includes three sensors 28, 30, 32, which sense the electromagnetic radiation received from the emitters 14. There is a plurality of probes 18 mounted on the vehicle 24, each probe 18 including at least two emitters 14. (It would be possible to use only a single probe 18 in this embodiment rather than a plurality of probes and to take measurements with that single probe at different locations.) There is a computer 20 that stores standard data for vehicles, includes a touch screen 22, and communicates with the emitters 14 and with the camera 16. There are also a keyboard 25 and printer 26 connected to the computer 20. Other user interfaces may also be used. The computer 20 is operably connected to each emitter 14, both to the emitters 14 on the reference frame 12 and to the emitters 14 on the probes 18. Each of the probes 18 has an electrical line 36 which plugs into a box 27 on the reference frame 12, and an electrical bus 38 extends from the reference frame 12 to the computer 20. The computer 20 is also connected to the emitters 14 of the reference frame 12 by the bus 38, and it is connected to the electromagnetic radiation sensors 28, 30, 32 of the camera 16 by a third electrical bus 40. In the following description, the emitters 14 and sensors 28, 30, 32 are discussed at length. Although the described embodiments involve the use of infrared light, it is understood that any wavelength of electromagnetic radiation, whether or not visible to the eye, may be used. Also, while the preferred embodiment uses strobing to distinguish one emitter from another, other methods, such as using different frequencies of electromagnetic radiation, or using different carrier frequencies for each emitter 14, could be used to distinguish the emitters 14 from one another.

Figure 3:
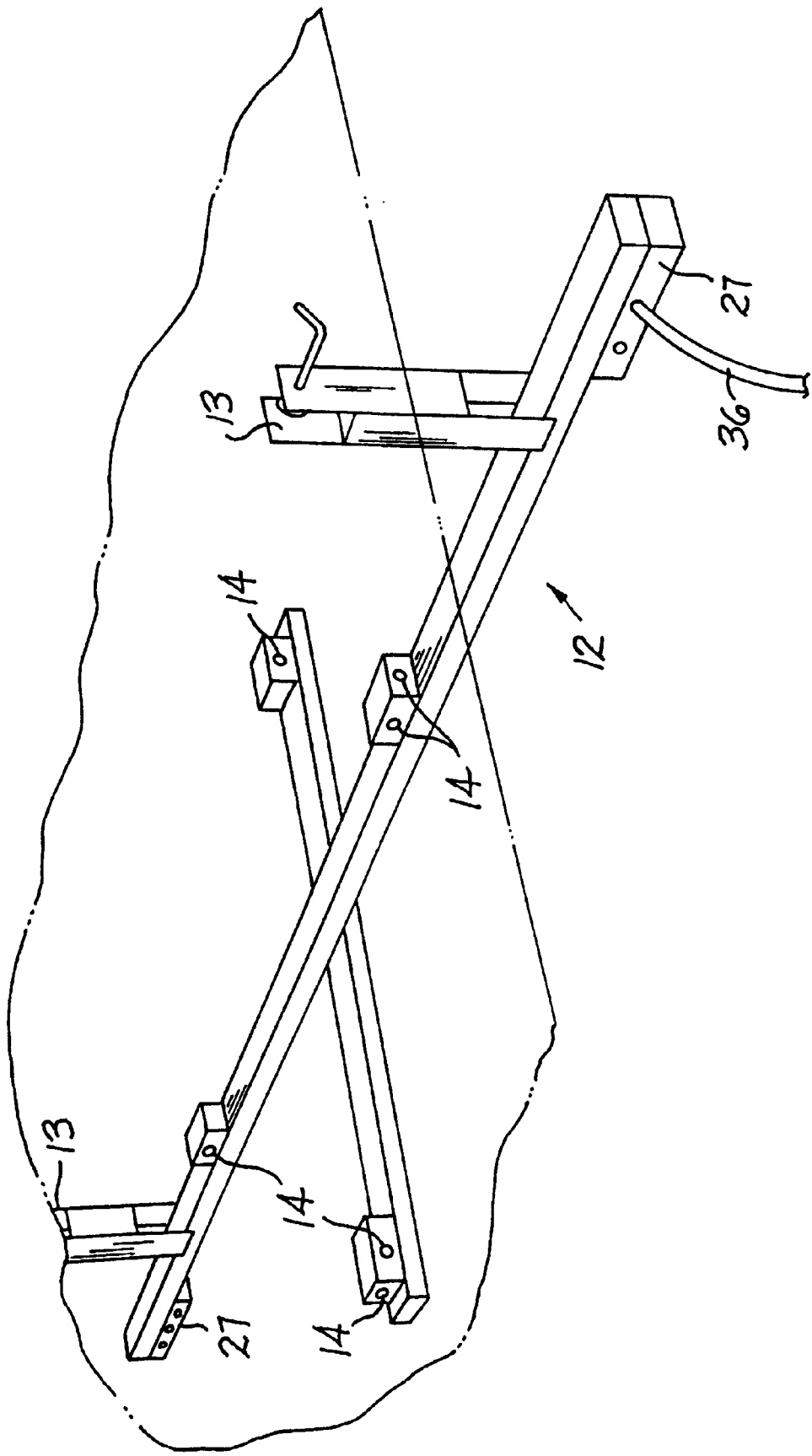
FIG. 3 is a perspective view of a preferred embodiment of a reference frame for use in the embodiment of FIG. 2.
Figure 3A:
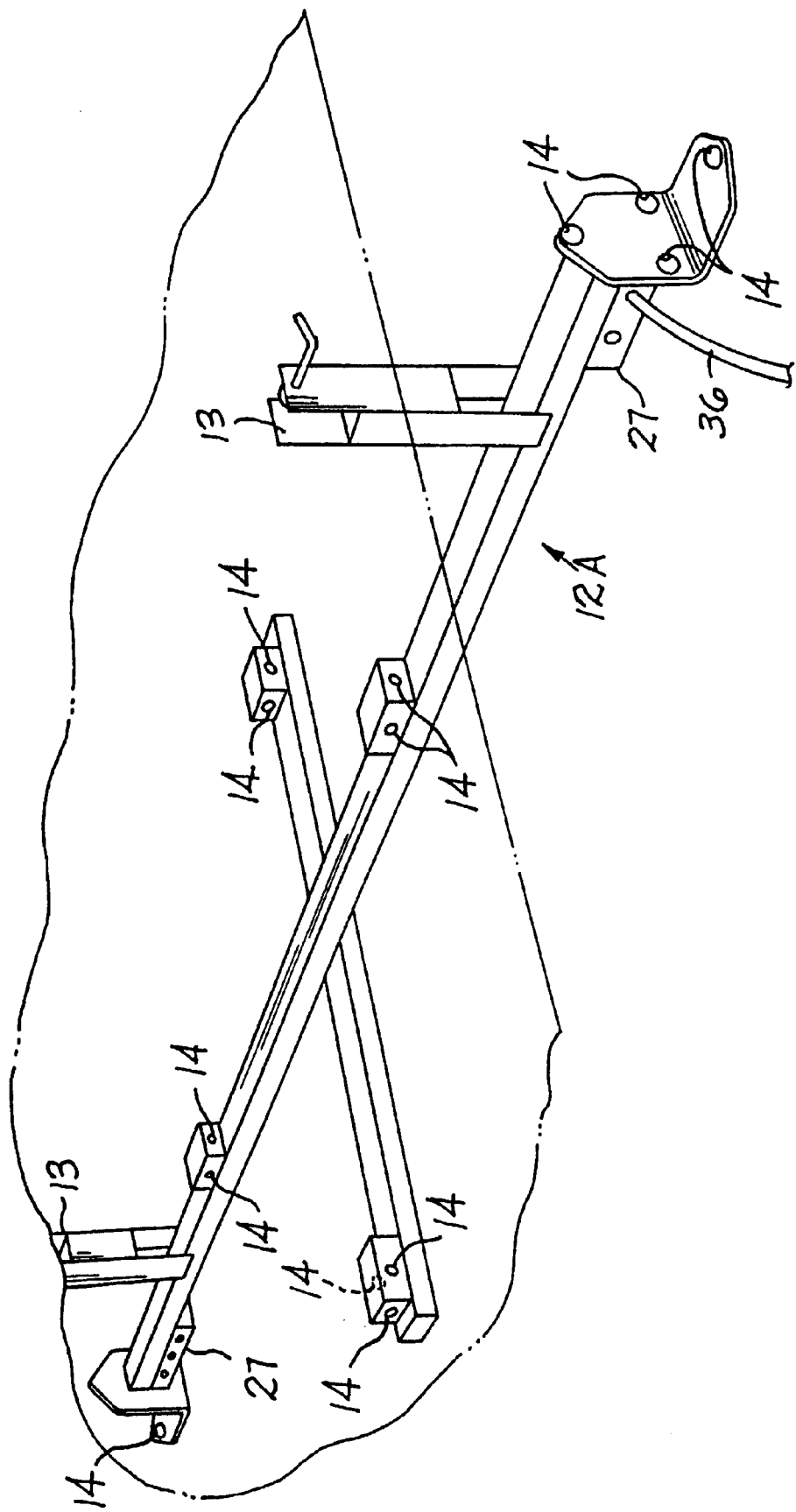
FIG. 3A is a perspective view of a second preferred embodiment of a reference frame for use in the embodiment of FIG. 2.
Figure 3B:
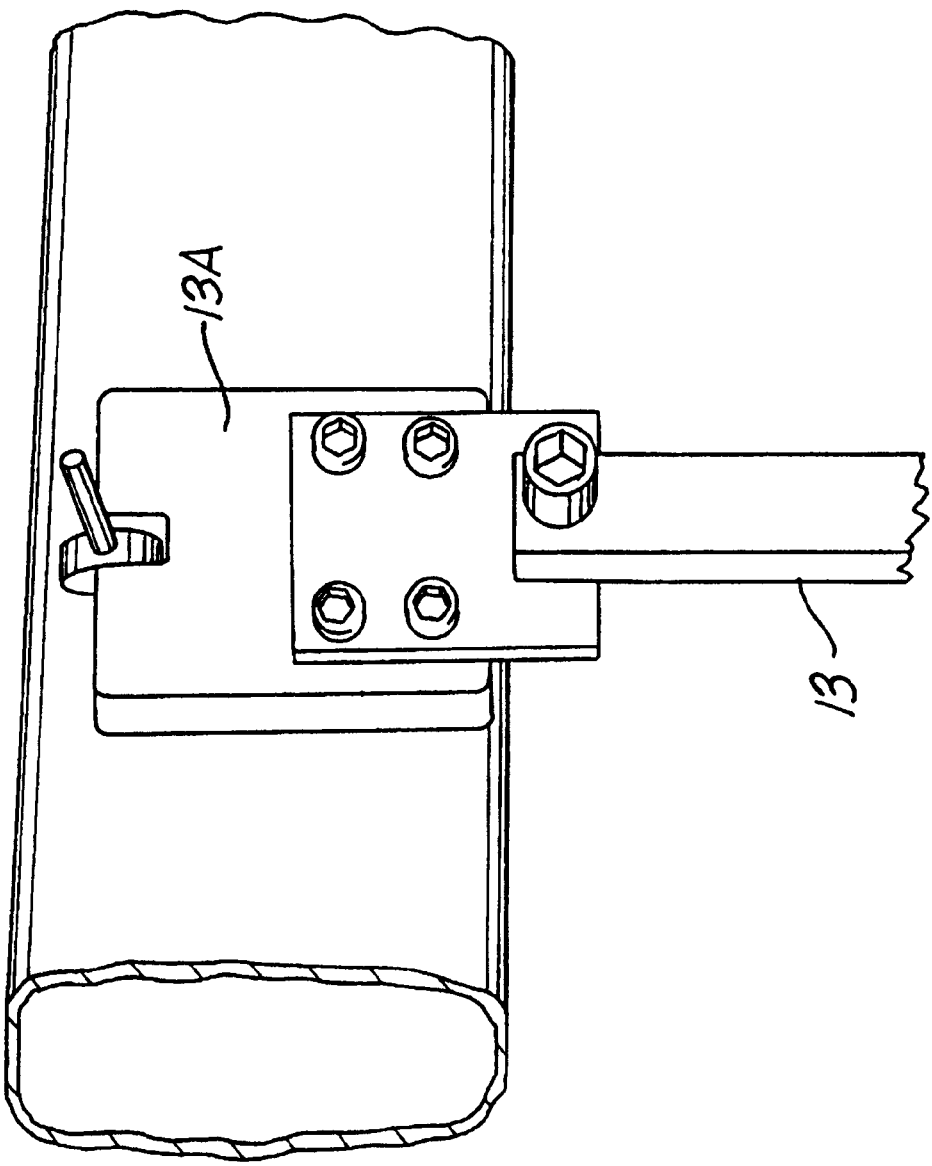
FIG. 3B is a broken-away perspective view of a magnetic mounting member 13A onto which the reference frames of FIGS. 3 and 3A can be clamped.

FIGS. 3 and 3A show two embodiments of reference frames 12, 12A made in accordance with the present invention. Each reference frame 12, 12A includes clamps 13, for clamping the frame 12, 12A onto the pinchweld of the vehicle or onto an adapter, and a plurality of emitters 14 directed in different directions. It is important for the emitters 14 to be directed in different directions so that the camera 16 can "see" at least three of the emitters 14 on the reference frame 12, 12A from any position from which it takes a measurement. The reference frame 12 enables the computer 20 to relate the new measurement back to the known coordinate system 5, even as the camera 16 is moved relative to the reference frame 12. The emitters 14 on the reference frame 12 are in a known, fixed spatial relation to all the other emitters 14 on the reference frame 12, and the computer 20 has been programmed to know that fixed spatial relation between the emitters 14 of the reference frame 12.

Figure 8:
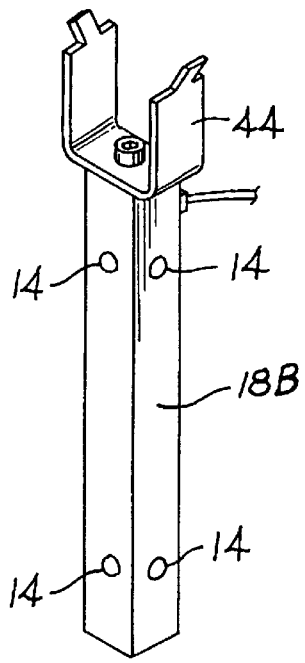
FIG. 8 is a view of an alternative type of probe, with emitters pointed in a plurality of directions.
Figure 9:
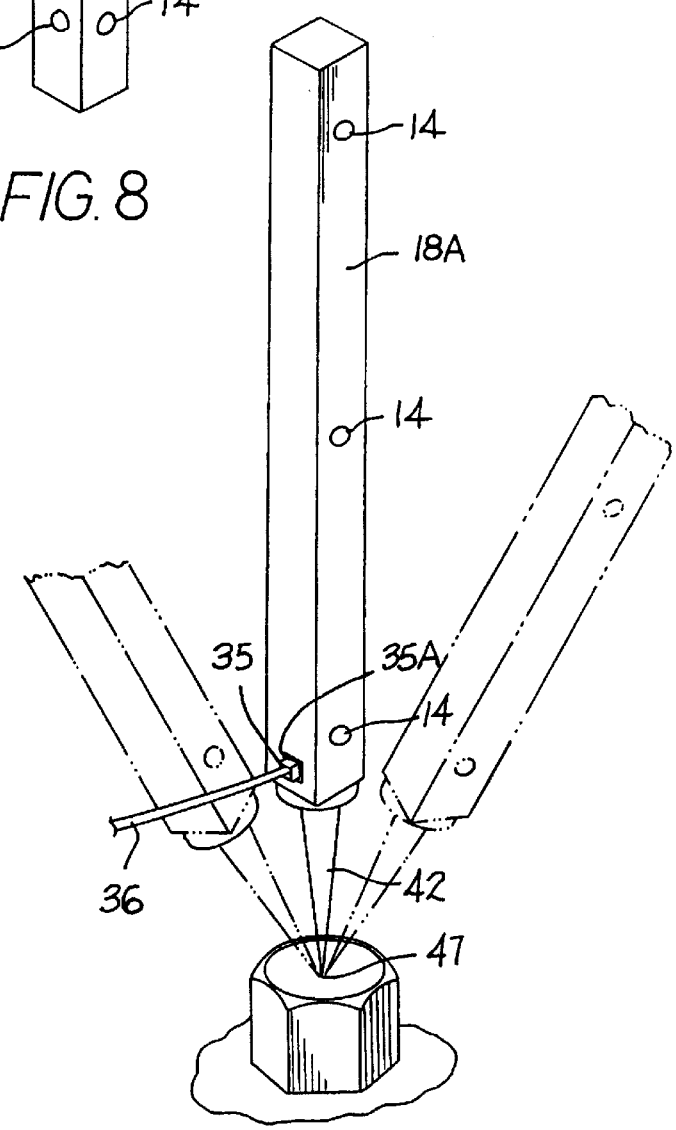
FIG. 9 is a perspective view of the probe of FIG. 7 with a pointer tip replacing the clip end, with the probe being shown in different positions in phantom.
Figure 10:
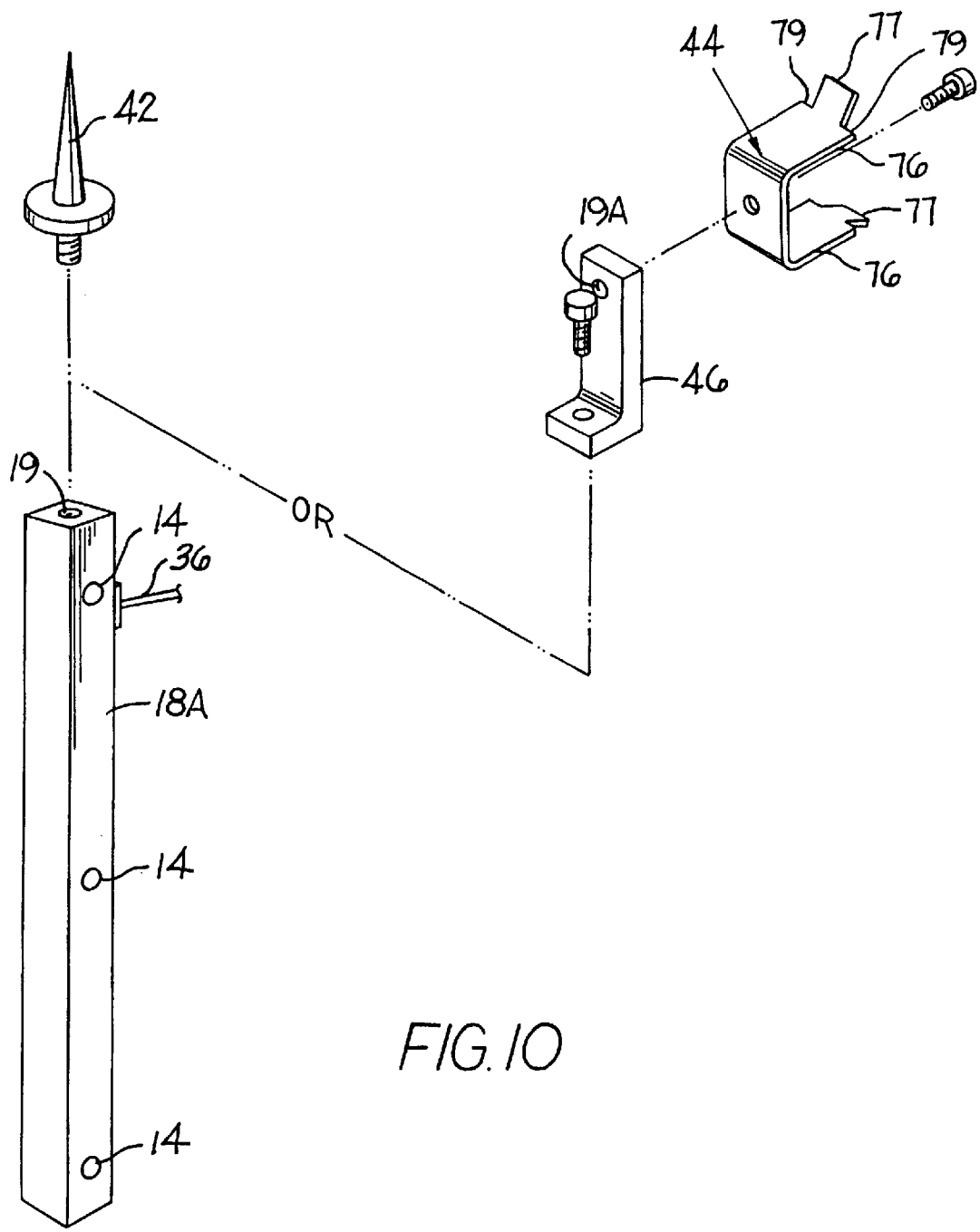
FIG. 10 is an exploded perspective view of the probe of FIG. 7, showing different connectors that can be added to the probe.
Figure 11:
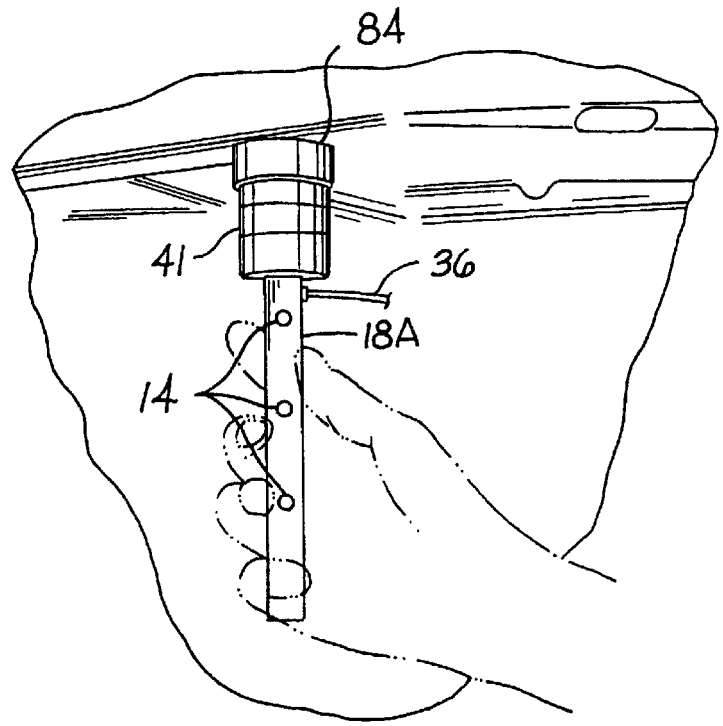
FIG. 11 is a view of the probe of FIG. 6 after it has been inserted into a reference hole of a vehicle.

FIGS. 5–14 show various views of the probes 18 and probe attachments. While it would be possible to use a wide variety of different shapes and sizes of probes, it has been found to be most efficient to use standard probes of two different lengths. The longer probe 18A has three emitters 14, and the shorter probe 18 has two emitters 14, which are in the identical positions with respect to the end of the short probe 18 as the first two emitters 14 are with respect to the end of the long probe 18A. As shown in FIG. 10, the probes 18A have a threaded hole 19 in one end to which connectors 41, 44, adapters 46, or pointing tips 42 may be attached. The connecting end of the short probe 18 is identical and receives the same attachments.

Figure 22:
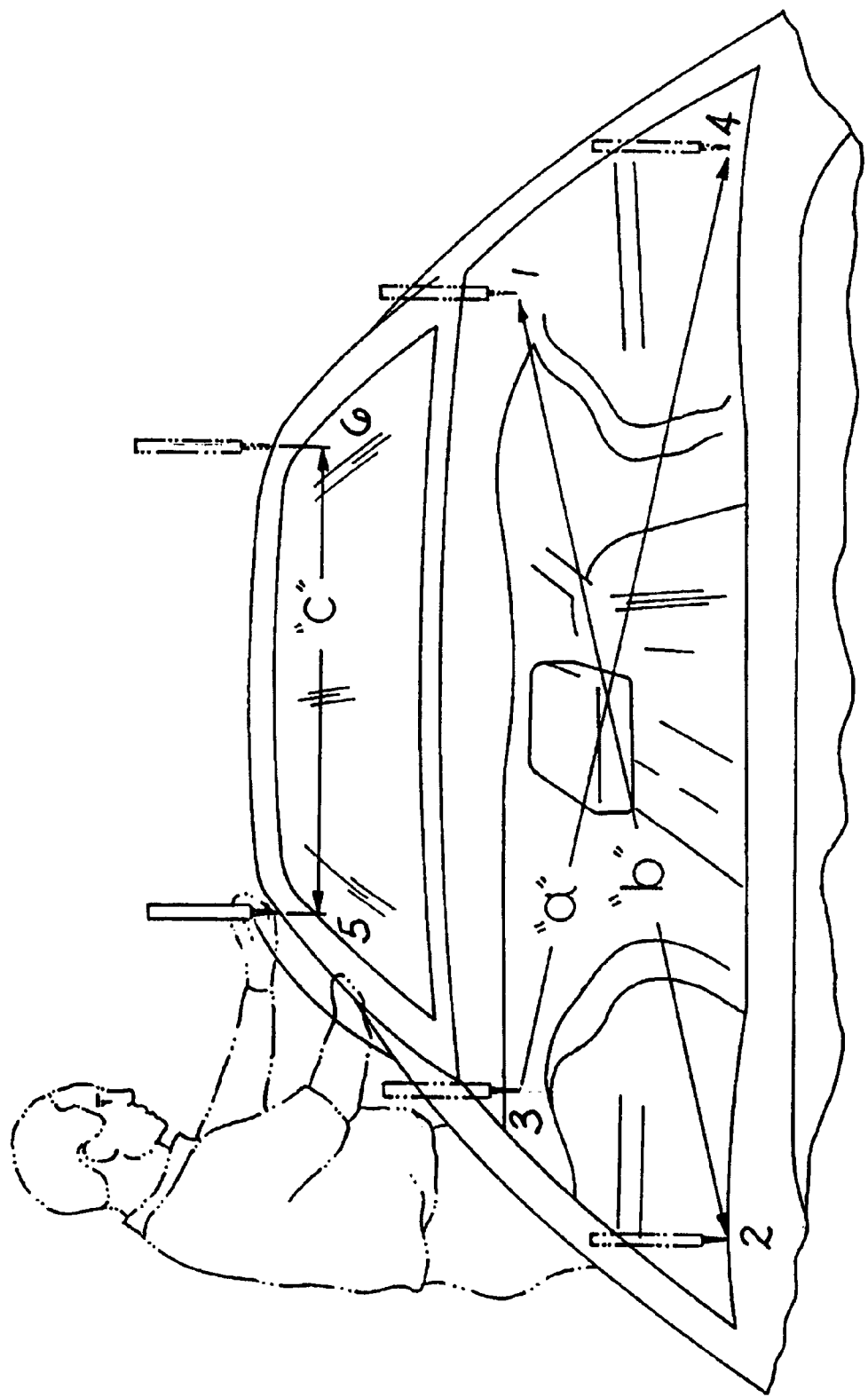
FIG. 22 is a perspective view of a vehicle engine compartment and passenger compartment being measured using the device of the present invention.

FIG. 9 shows a probe 18A with a needle or pointing tip 42 threaded into the hole 19 (which is shown in FIG. 10). Each probe 18, 18A has an electrical receptacle 35 which receives an electrical connector 35A at the end of the cable 36. The other end of the line 36 is plugged into a box 27, which was shown in FIGS. 2–2D, 3, and 3A. The pointer tip 42 is touching the center of a bolt. This tip 42 makes the probe 18A a hand-held probe, because it cannot readily be placed and left at a position on the vehicle. However, the benefit of this type of probe is that it can be placed anywhere on the vehicle, including any point on the upper body of the vehicle, and the probe 18A may have any orientation. FIG. 2A shows a person using a hand-held probe of this type to measure a point in the door frame. FIG. 22 shows a person using a hand-held probe of this type to measure points in the cab and in the engine compartment, which would be very difficult or impossible to measure with other types of vehicle measuring systems, which use mechanical frames to bring measured points down to a plane in order to be measured.

Since there is a fixed relationship between the locations of the emitters 14 and the end 47 of the probe 18, once the computer has determined the locations of the emitters 14, it can determine the location of the point 47 being measured by the probe 18A. The pointing tip 42 is usually used with the longer probe 18A, so that, if any one of the emitters 14 of the probe 18A cannot be seen, the computer can still determine the location of the point being measured by the probe 18A by "seeing" the other two emitters 14 on the probe 18A. A line 36 with a trigger 43, shown in FIG. 14, usually replaces the regular line 36 when the pointer 42 is used, to enable the user to remotely control the measurements that are being taken.

If the relative positions of the emitters 14 to the point being measured by the probe 18A were different for the different types of probes or end connectors, then the computer 20 would instruct the operator which type of probe or end connector is to be used to measure a particular point, and the computer would then compensate for the different type of probe or end connector in making its calculations.

Figure 14:
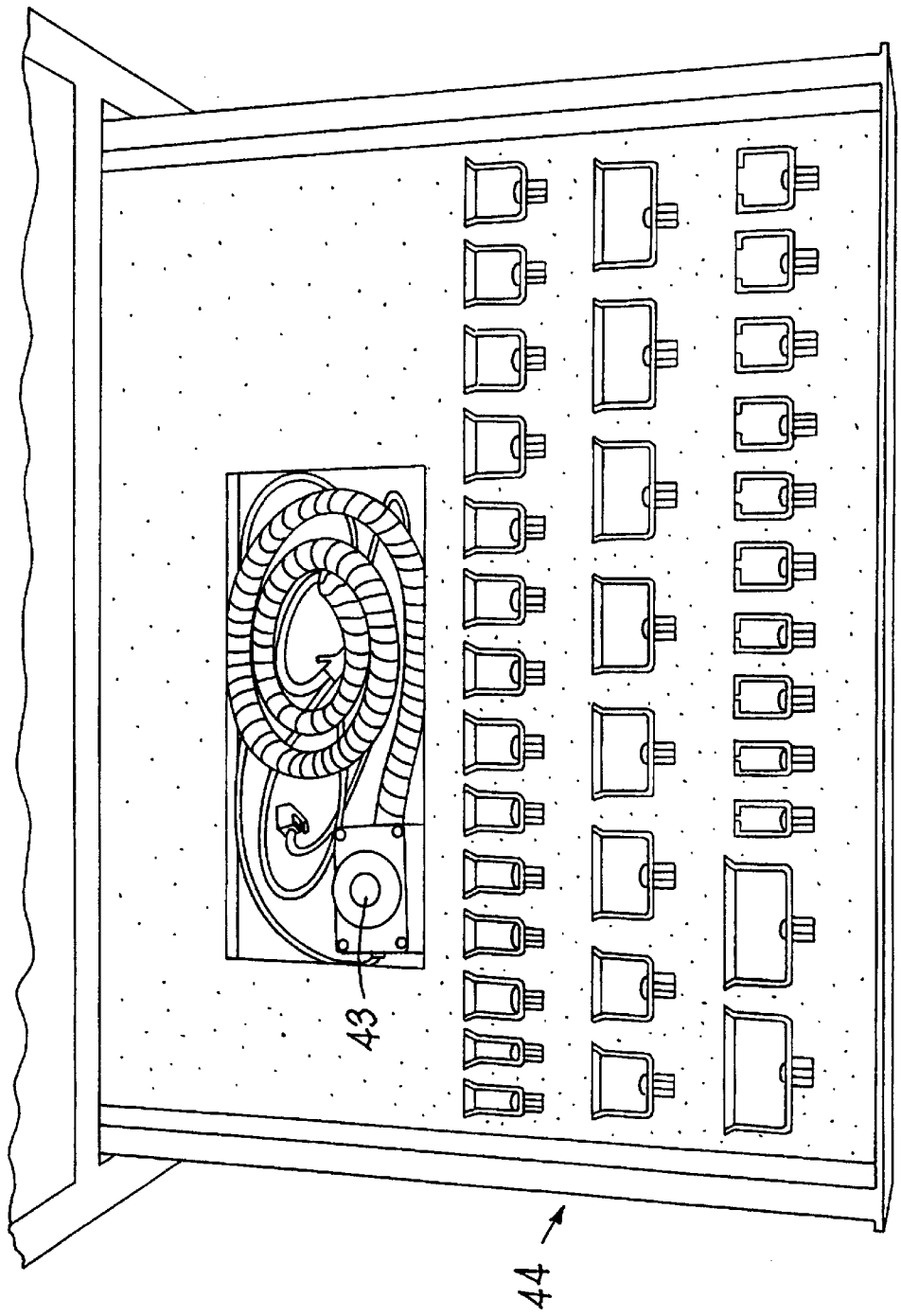
FIG. 14 shows a box of attachments that can be added to probes.

FIG. 10 shows a spring clip connector 44, which is held onto the end of the probe 18A by means of an alien screw. The spring clip connectors 44 come in a wide variety of sizes, which correspond to the sizes of reference holes on vehicles, as shown in FIG. 14. Each connector 44 is labeled with a letter, such as A, B, C, etc., and the computer 20 instructs the user as to which connector 44 should be used to measure which reference hole on the vehicle. All the clip connectors 44 preferably are sized so that the point being measured is always in the same position with respect to the emitters 14 of the probe 18. (This is not necessary, but it reduces the number of calculations required.) The clip connector 44 of FIGS. 5 and 10 has flexible prongs 76 with curved tips 77. The clip 44 serves to center the probe 18A in the hole 78. The outwardly-curved tips 77 depart abruptly from the prongs 76 of the clip 44 at the shoulders 79, and the shoulders 79 are always located at the surface of the vehicle, so that, knowing the positions of the individual emitters 14, and knowing the dimensions of the probe 18A, the computer can readily determine the location of the center of the hole 78 in which the probe 18A is located.

Some of the spring clip connectors 44 in the bottom right hand portion of the box of FIG. 14 have ends which are directed inwardly, which permits them to grab onto a nut or a bolt.

FIG. 10 also shows a right angle attachment 46, which mounts to the hole 19 in the probe 18A and has a threaded hole 19A at right angles to the hole 19, which permits a clip connector 44 or a pointer end 42 to be mounted at right angles to the probe 18. When the right angle attachment 46 is used, it is necessary for the computer to compensate, because this attachment does shift the measured point slightly with respect to the emitters 14. The computer knows when to make this compensation, or any other necessary compensation, because it has information about all the probes and connectors stored in a "tool file" in its software, and because the computer is instructing the user as to which type of connector and clip to use for each point to be measured. In the preferred embodiment, the distance from the end-most emitter 14 to the point being measured is the same for all probes and most attachments, and the emitters 14 are directly in line with the point being measured.

Figure 12:
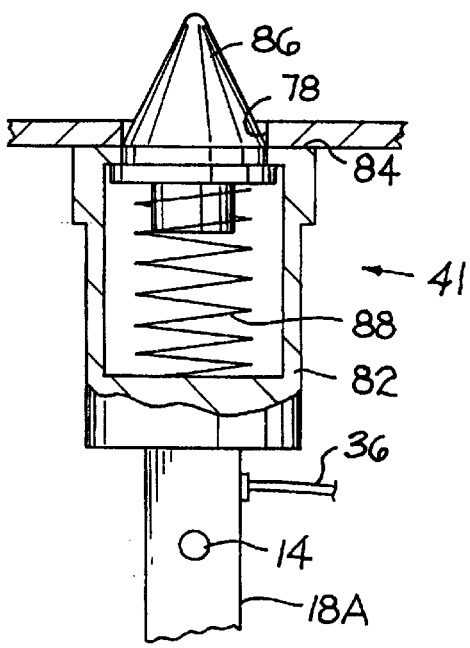
FIG. 12 is a broken-away sectional view of the probe of FIG. 11.
Figure 13:
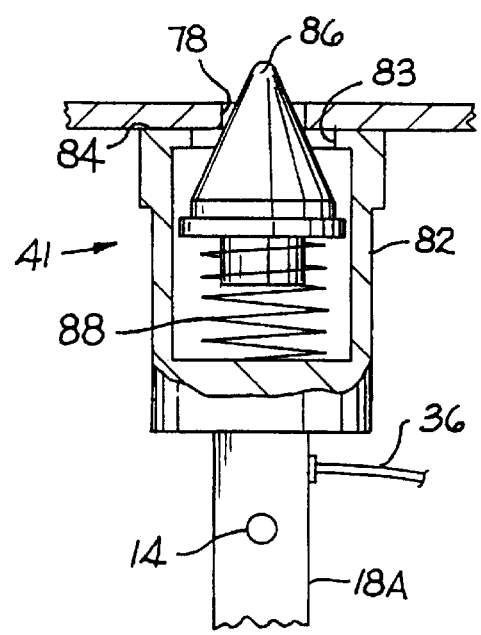
FIG. 13 is a broken-away sectional view of the probe of FIG. 12 inserted into a smaller diameter hole.

FIGS. 6,11, 12, and 13 show a magnetic attachment 41, which can also be threaded into the threaded hole 19 in the probes 18, 18A. This magnetic attachment 41 has a hollow magnetic body 82, with a flat end 84. A conical member 86 is mounted inside the magnetic body 82 and projects out an opening 83 in the flat end 84. The conical member 86 is spring-loaded by means of a spring 88. When this magnetic attachment 41 is mounted in a hole 78 of a vehicle 24, the flat end 84 always rests against the surface of the vehicle 24, and the cone 86 projects into the hole far enough that it centers the probe 18A with respect to the hole. FIG. 12 shows the cone projecting a long way into a large hole, and FIG. 13 shows the cone 86 projecting a short distance into a small hole. Since the point being measured is always fixed relative to the flat surface 84, regardless of how far the cone 86 projects into the hole, the computer always knows where the measured point is located relative to the emitters 14 on the probe 18A (or 18) and can thereby calculate the point being measured by the probe 18A.

Figure 4:
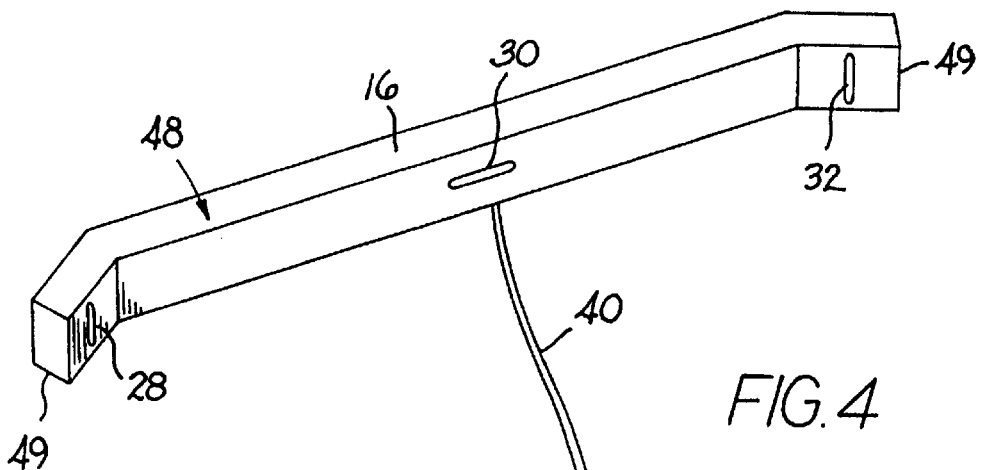
FIG. 4 is a perspective view of a camera for use in the present invention.
Figure 5:
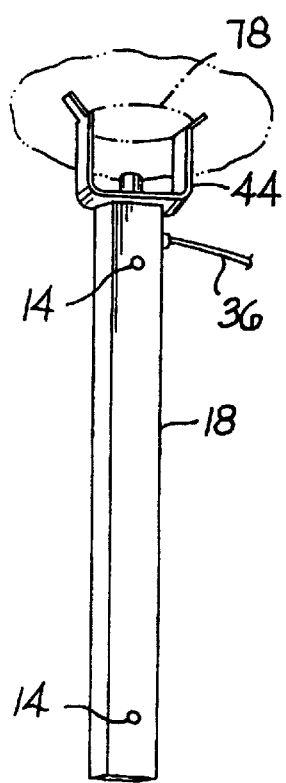
FIG. 5 is a perspective view of a probe with a clip mounted on its end, inserted in a reference hole of a vehicle.
Figure 6:
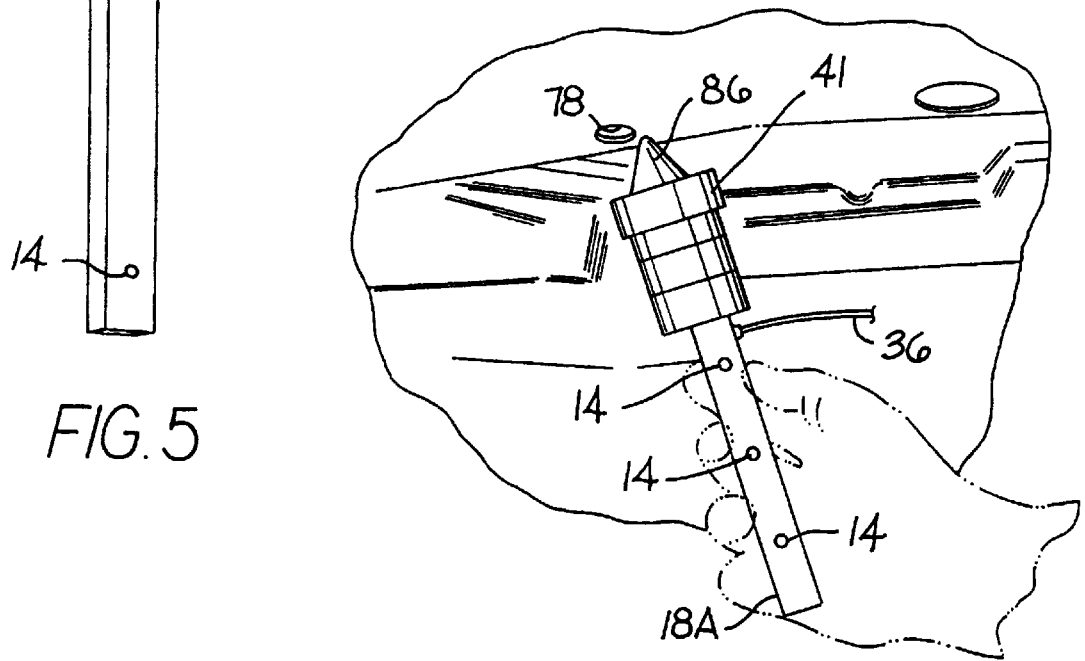
FIG. 6 is a perspective view of a magnetic probe being inserted into a reference hole of a vehicle.

FIGS. 2, 2A, 2B, 2C, 2D, 4, 4A, and 4B show various cameras 16, 16A, 16B, 16C, which can be used in the present system 10. Each camera 16, 16A, 16B, 16C preferably has at least three sensors 28, 30, 32 mounted in fixed relation to each other. The sensor units 28, 30, 32 are preferably made up of a plurality of one-dimensional electromagnetic radiation sensors, such as charge coupled devices (CCDs). The camera 16 of FIG. 4 is a generally horizontal boom 48 having two ends 49 that have been bent inwardly approximately 45 degrees. The boom 48 preferably is mounted on a stand 50 with wheels 52, as shown in FIG. 2. (Any of the cameras 16–16C could similarly be mounted on the stand 50 and used.) The stand 50 has several adjustment knobs 54, which permit the camera 16 to be placed at any desired height or angle, and the stand 50 may be wheeled around the shop to view the vehicle from any desired position.

In the camera 16 of FIG. 4, one of the sensors 30 is located at the center of the boom 48 behind a horizontal slit, and the other two sensors 28, 32 are located on the ends 49 of the boom 48 behind vertical slits. (The terms "vertical" and "horizontal" are relative terms and are used here simply for ease in understanding.) It is not necessary for the boom 48 to be oriented horizontally as shown here, so the slits could be at various orientations, depending upon the orientation of the boom 48. Also, as shown in the cameras 16B and 16C, it is not necessary for the slits to be perpendicular to each other. What is necessary is that the slits not all be coaxial, because they must determine three intersecting planes in order to determine the position of the point being measured.

Figure 4A:
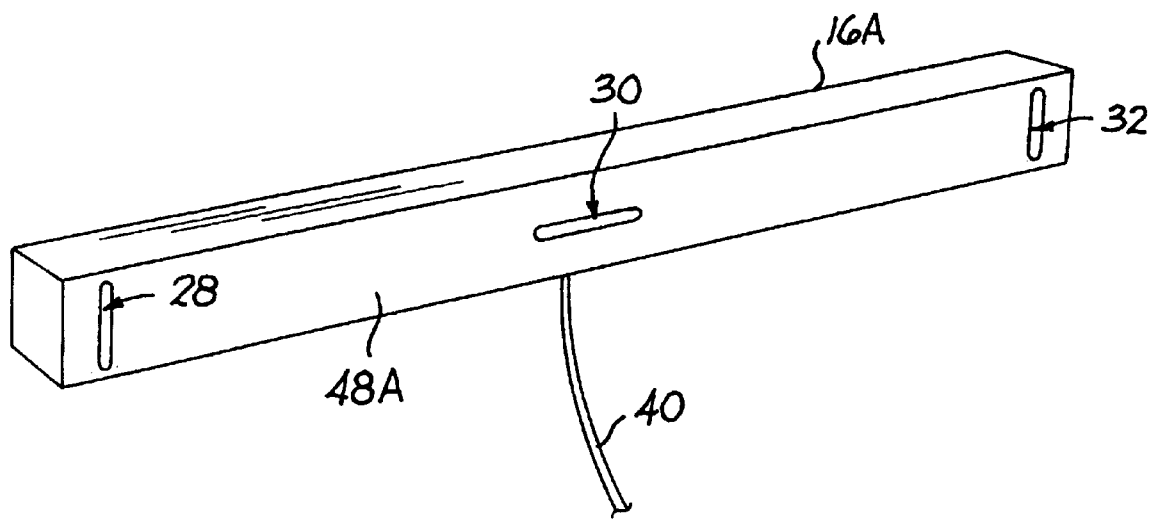
FIG. 4A is a perspective view of a second embodiment of a camera for use in the present invention.
Figure 4B:
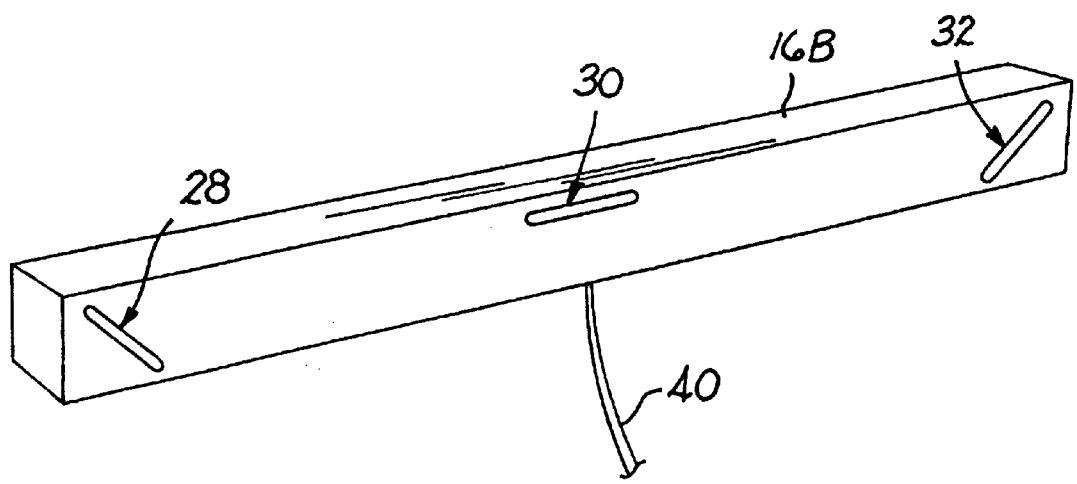
FIG. 4B is a perspective view of a third embodiment of a camera for use in the present invention.
Figure 7:
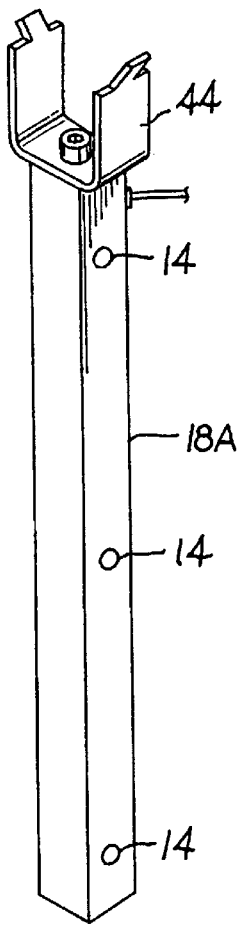
FIG. 7 is a perspective view of a probe that is identical to the probe in FIG. 5 but longer.

In the camera 16A of FIG. 4A, the boom 48A is straight rather than being bent at the ends. This helps the camera 16A sense over a longer distance and is therefore preferable. In the camera 16B of FIG. 4B, the outer slits are at a 45° angle relative to the center slit. In the camera 16C, shown in FIG. 2D, the camera 16C has a pyramidally-shaped body, and the slits are located at 60° angles to each other on each face of the pyramid.

The three sensor units 28, 30, 32 on the camera 16 of FIG. 4 are identical to each other, except for their positions within the camera 16, with the sensors 28, 32 being oriented horizontally behind vertical slits, and the center sensor 30 being oriented vertically behind a horizontal slit. All the sensors 28, 30, 32 in all the cameras 16–16C should be orthogonal to the direction of their respective slits. The sensor 28 will be described in detail herein, and it will be understood that the other sensors 30, 32 function in the same way, lying orthogonally to their respective slits.

As shown in FIGS. 15 and 16, the sensor 28 is oriented along the major axis of the camera 16A. For ease of description, this direction will be referred to as the horizontal direction. A glass plate 64 lies on the inner surface of the front of the camera housing 16A and in front of the photodetector 62 and serves as a band pass filter, allowing only a narrow band of electromagnetic radiation to pass through, thereby eliminating much of the ambient noise. In this case, since the preferred electromagnetic radiation being emitted from the emitters is infrared light, the band pass filter allows only infrared light through. The emitters 14 are preferably light-emitting diodes which emit infrared light. If the emitters 14 were emitting a different wavelength of electromagnetic radiation, the band pass filter 64 would be selected to allow that desired wavelength through. An elongated vertical slit 60 is defined by an elongated vertical discontinuity in the coating 64A on the back surface of the band pass filter 64 and can be seen in FIGS. 16 and 16A. This vertical slit 60 permits only a vertical plane 61 of the electromagnetic radiation coming from the emitter 14 to reach the linear photodetector 62 of the sensor 28. Again, it should be noted that the camera 16A may be located in any position from which it can "see" the emitters 14 being measured, so the plane of electromagnetic radiation 61 entering the slit 60 may not be vertical but will be aligned with the slit 60, whatever position the slit 60 may take. The linear photodetector 62 preferably is a charge coupled device (CCD) approximately one pixel in width and 3700 pixels in length, which senses the presence and intensity of the electromagnetic radiation that impinges on it. The linear photodetector 62 is positioned so that its long axis is orthogonal to the slit 60.

When the plane 61 of electromagnetic radiation from the emitter 14 passes through the slit 60, through the band pass filter 64, and impinges on the photodetector 62, it forms a real image line 58 on the surface 70 of the linear photodetector 62. The photodetector 62 then generates an output that is related to the position and intensity of the electromagnetic energy received on its surface, which serves to locate the real image line 58. Those elements, or pixels, of the detector 62 illuminated by the real image line 58 will generate a strong signal, while those not illuminated will generate a very weak or null signal. A graph of the image intensity, or signal strength, is a signal peak curve 66, as shown in FIG. 17. The curve 72 shows the signal coming from the photodetector 62 when an emitter 14 is on. The curve 68 shows the signal coming from the photodetector 62 when all emitters 14 are off. The curve 74 shows the resultant when the curve 68 is subtracted from the curve 72, thereby removing most of the ambient noise. The line 80 represents a threshold level, below which signals are ignored.

Note that, when all emitters are off, the signal level 68 never quite reaches zero due to the effects of ambient electronic noise. If there is little noise, the position of the real line 58 on the photodetector 62 can be determined from the signal 72. However, it is preferable to subtract the background noise as shown here and determine the position of the real line 58 using the resultant curve 74, from which most background noise has been removed. In order to subtract the background noise, the output signal preferably is stored in digital memory. The readings when all emitters are momentarily extinguished are then subtracted from the current data to obtain the data generated by the current illuminated emitter 14. The two measurements 72, 68 differ substantially only at the location of the real image 58, and this difference exceeds the threshold level 80. Thus, the position of the image 58 can readily be determined. A usable measurement taken from the curve 74 could be any of the following: (1) the position of the individual photodetector element with peak intensity, (2) the intensity-weighted average of all over-threshold elements, or (3) the average of the minimum and maximum elements where the intensity is over some threshold.

Knowing the distance d from the surface 70 of the photodetector 62 to the slit 60 and the displacement distance of the line 58 from the center c of the photodetector 62 located directly behind the slit 60, the computer 20 can calculate the angle α at which the plane 61 impinges on the sensor 28. Once the point 58 is determined, the angle α can readily be calculated. Thus, at this point, the computer 20 knows the angle α defining the plane 61 from the emitter 14 to the center of the first slit 60. Since the other sensors 30, 32 on the camera 16 are making similar measurements, and the computer 20 knows the relative positions of the sensors 28, 30, 32 in the camera 16, the computer 20 knows three planes in which the emitter 14 lies. The intersection of those three planes determines a single point in space, which is the location of the emitter 14 relative to the camera 16. If the computer 20 knows the location of the camera 16 relative to the fixed coordinate system 5, or if the camera 16 is also sensing the positions of reference emitters 14 whose location is known in the fixed coordinate system 5, the computer 20 can then translate the calculated position of the emitter 14 into the fixed coordinate system 5.

The three sensors 28, 30, 32 are preferably arranged along a line or arc so that each sensor is generally equidistant from the illuminated emitter 14 that is to be pinpointed in space. When the sensors 28, 30, 32 are arranged along a horizontal arc, as in the cameras 16 and 16A, the middle sensor 30 is oriented so as to measure the angular elevation of the illuminated emitter 14. The two outer sensors 28, 32 measure the horizontal angle. (Again, the use of horizontal and vertical is for ease of understanding, and it is understood that the camera may be placed in any position in which it can "see" the emitters to be sensed.) All three sensors 28, 30, 32 must be placed so that the illuminated emitters 14 to be measured are completely within their field of view. Additional sensors could be used to broaden coverage of the field of view or to enhance measurement resolution and accuracy, as in the camera 16C of FIG. 2D. However, it has been found that, if the camera is able to move around to take the readings, three sensors are sufficient to obtain good measurements.

The details of the structure and operation of the computer 20, and specifically, its control system are as follows: The computer's control system supplies power to the emitters 14, strobing them individually at known intervals. It also powers the electromagnetic radiation sensors 28, 30, 32. The angular data signals from the sensors 28, 30, 32 are received by the computer 20, and the computer 20 subtracts the background noise data 68, taken when all the emitters 14 are off, from the data 72, taken when the emitter 14 is on, obtaining the resultant 74, from which most noise has been removed. This data is used to determine the angles a from the camera slits to the emitter 14, and then, by triangulation, the position of the emitter 14 relative to the camera 16 is calculated. In the case of the probes 18, the computer 20 uses the positions of the probe's emitters 14 and the known configurations of the probes 18 to calculate the position of the point being measured by the probe (i.e. the center of the hole in which the clip 44 or magnetic connector 41 is located or the tip of the needle probe 42) relative to the camera 16. This position is then related back to the fixed, standard coordinate system 5.

Reference points from which the computer can relate the data back to the fixed coordinate system 5 may be provided in several ways. The preferred method, shown in FIGS. 2 and 2A, is to fix a reference frame 12 relative to a portion of the vehicle that will not move during the alignment process and to place at least three probes 18 with connectors 41 or 44 onto undamaged portions of the vehicle, for which standard measurement data are available. Measurements are then taken, and, by knowing the relationship between the locations of the emitters 14 on the reference frame 12 and the locations of the emitters 14 on the probes 18 in known, undamaged points of the vehicle, the location of the reference frame 12 is established relative to the vehicle's stored, fixed coordinate system 5. Then, as long as emitters 14 from the reference frame 12 can be seen when a new measurement is to be taken, the computer 20 will relate those newly-measured points back to the fixed coordinate system 5. If the computer does not receive data from at least three reference points, it cannot relate the newly-measured points back to the fixed coordinate system 5, so data will not be returned, and red indicators will appear on the screen 22, telling the user that the camera 16 must be moved into a better position. If the sensors 28, 30, 32 cannot sense signals from at least two emitters 14 on a probe 18, data will not be returned for that probe, and red indicators will appear on the screen 22, telling the user that the probe cannot be seen.

Figure 2B:
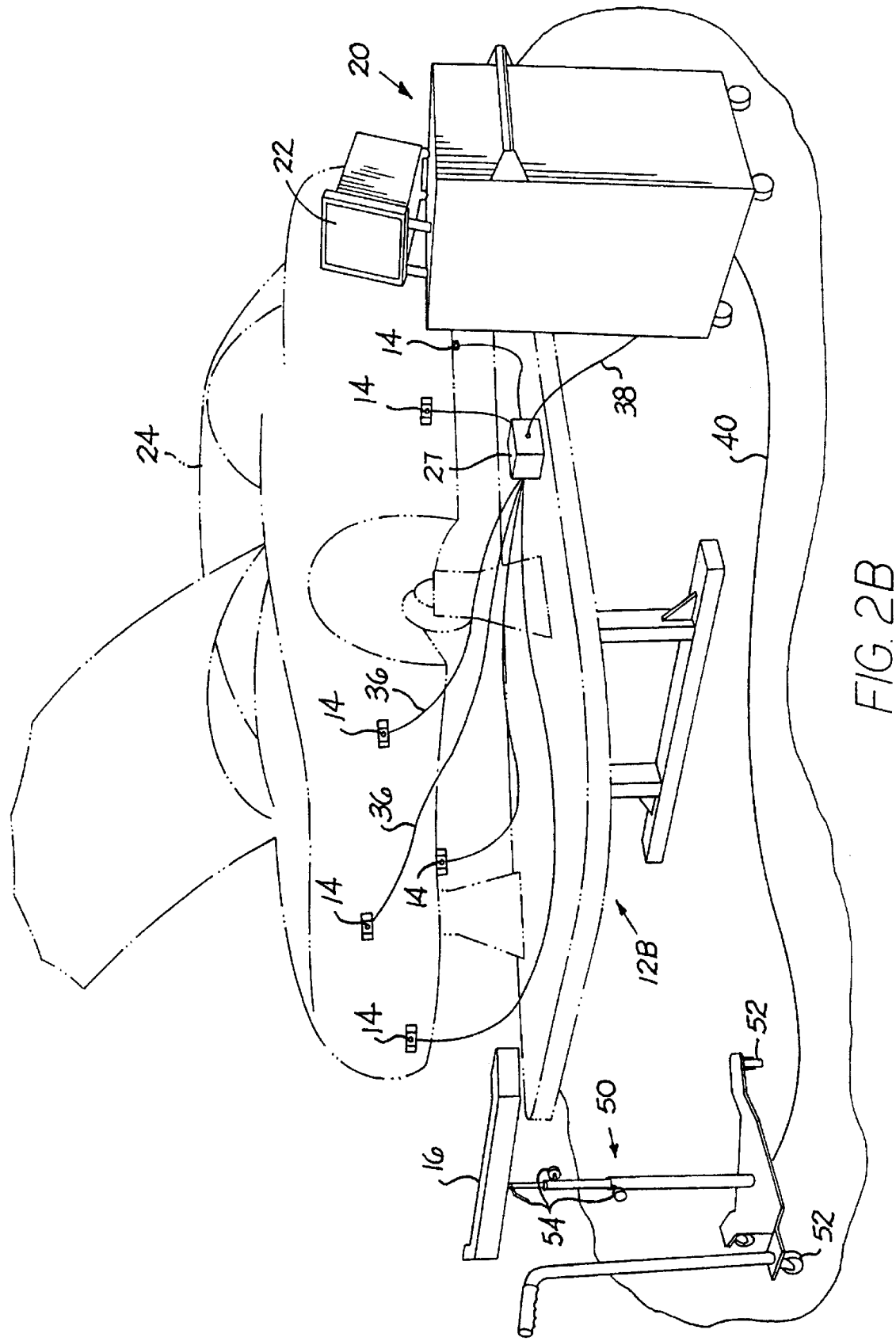
FIG. 2B is a perspective view of a first alternative embodiment of a measuring system made in accordance with the present invention.
Figure 2C:
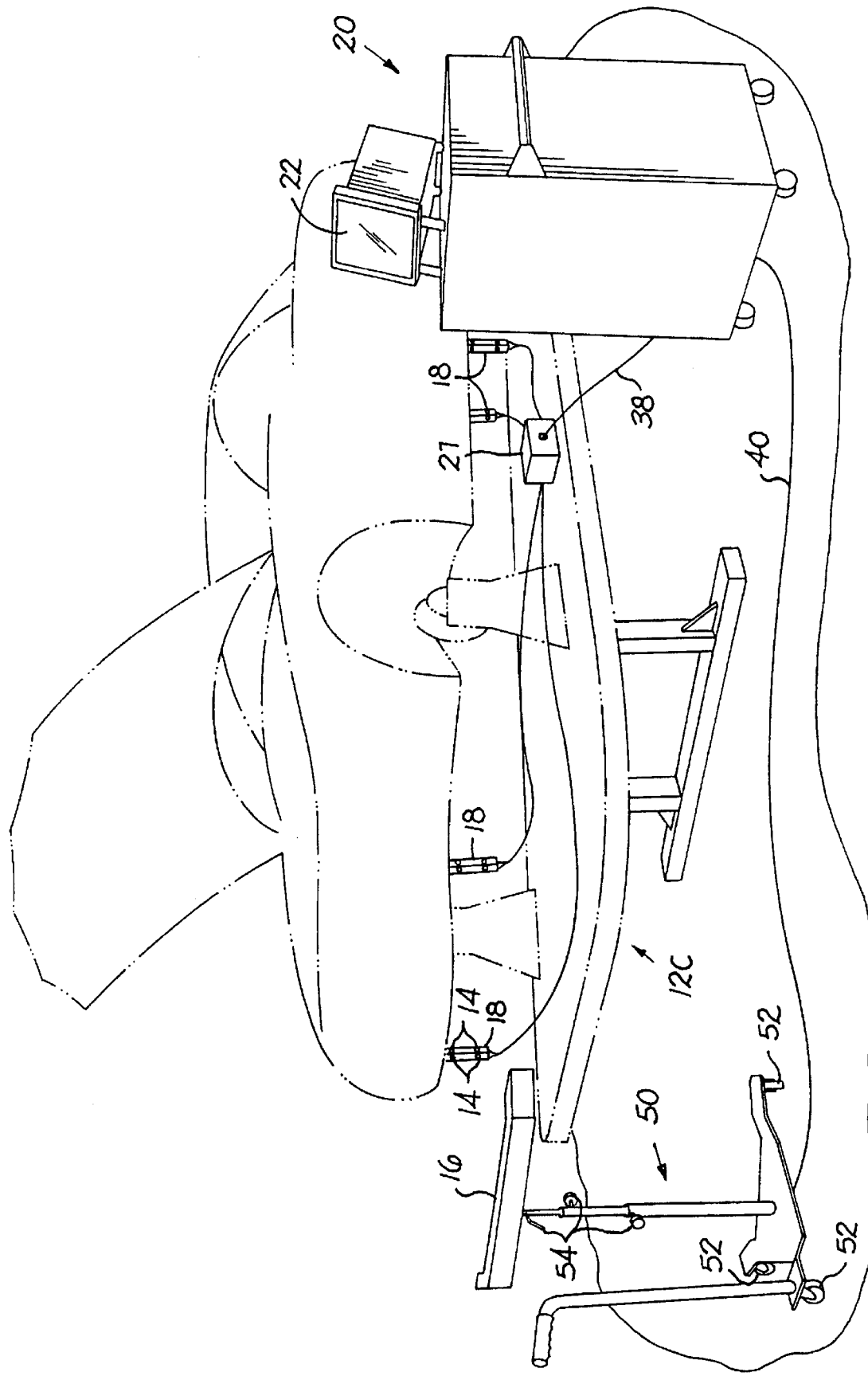
FIG. 2C is a perspective view of a second alternative embodiment of a measuring system made in accordance with the present invention.

Another method for providing reference points is to provide fixed probes 18 in undamaged portions of the vehicle, which will not move during the alignment process, as shown in FIG. 2C. These fixed probes 18 will stay in position during the entire measuring process and, being fixed relative to the vehicle, they collectively define a reference frame 12C. The fixed probes 18 preferably have reference emitters 14 directed in different directions so the camera 16, 16A, or 16B can "see" the emitters 14 as it is moved around the vehicle taking measurements. An example of a preferred fixed probe 18B for use in this type of reference frame 12C is shown in FIG. 8. This probe 18B has emitters 14 on at least two sides, and preferably on all four sides. Once the positions of the reference emitters 14 are established relative to the fixed coordinate system 5, the computer 20 can relate newly-measured points back to the fixed coordinate system 5 as long as three of the reference emitters 14 are seen from the same camera position in which the new points are being measured.

Another method for providing reference emitters 14 is simply to attach individual emitters 14 around the vehicle, thereby defining a reference frame 12B, as shown in FIG. 2B. The camera 16 is then moved around the vehicle, sensing the various fixed reference emitters 14 and establishing the relative positions between the emitters 14. Then, a probe or probes 18 are used to measure known points from the same camera position that some of the reference emitters 14 are measured, thereby establishing the relationship between the reference emitters 14 and the fixed coordinate system 5. Once that relationship is established, the camera 16 can be moved around the vehicle to take measurements as long as some of the reference emitters 14 are measured from the same camera positions as the new points are measured, and the new points will then be related back to the standard coordinate system 5 by the computer 20.

Figure 2D:
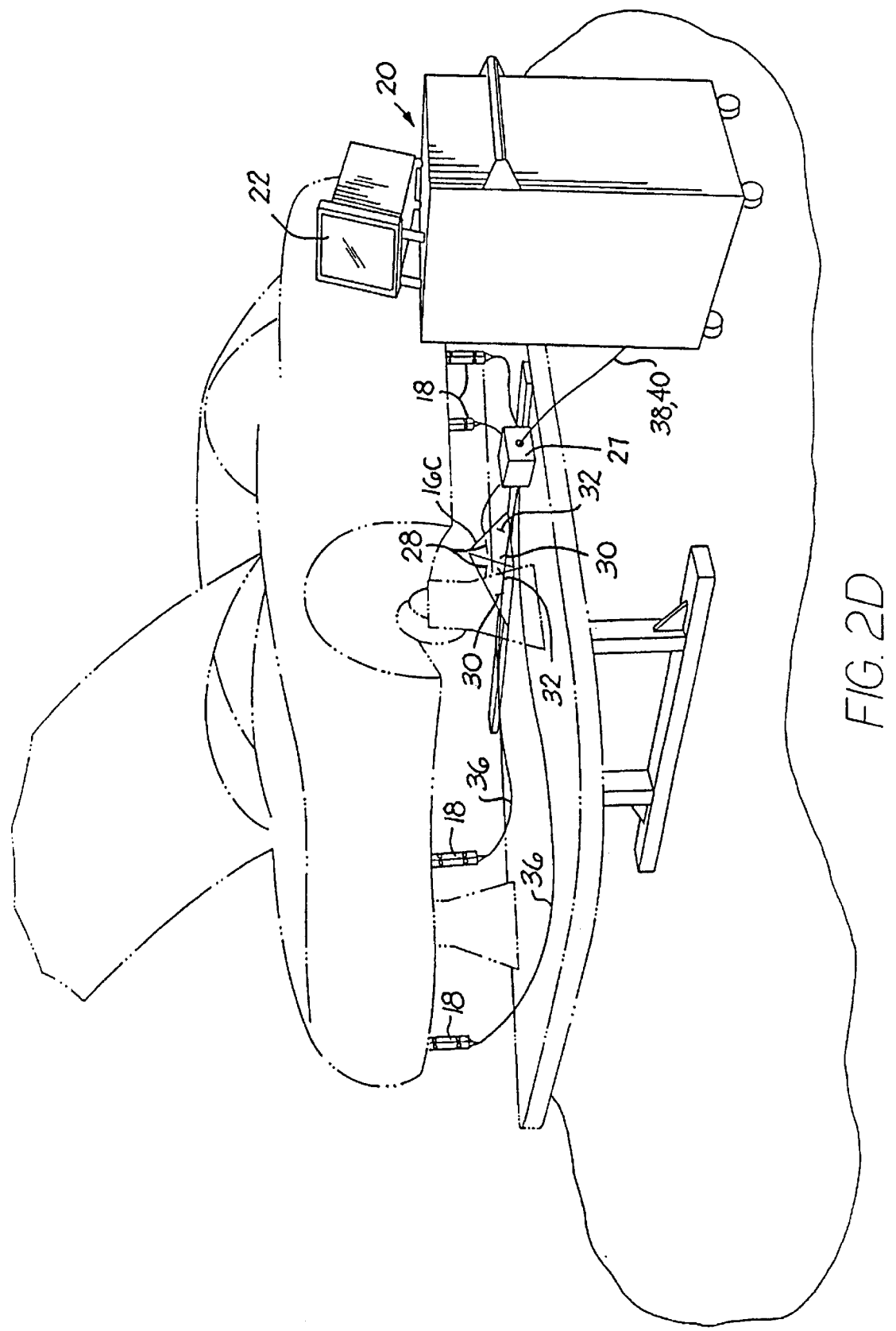
FIG. 2D is a perspective view of a third alternative embodiment of a measuring system made in accordance with the present invention.

A fourth alternative is to fix the camera relative to a portion of the vehicle that will not move during the alignment process, as shown in FIG. 2D. In this case, once the positions of known, undamaged points on the vehicle are established relative to the camera, the position of the camera relative to the fixed coordinate system is established, and the new measurements taken by the camera can then be related back to the fixed coordinate system by the computer 20. In this embodiment, the pyramidal camera 16C is preferred, because it has a wider range of vision, although any of the cameras could be used as long as they could "see" the points to be measured from their fixed position.

Figure 18:
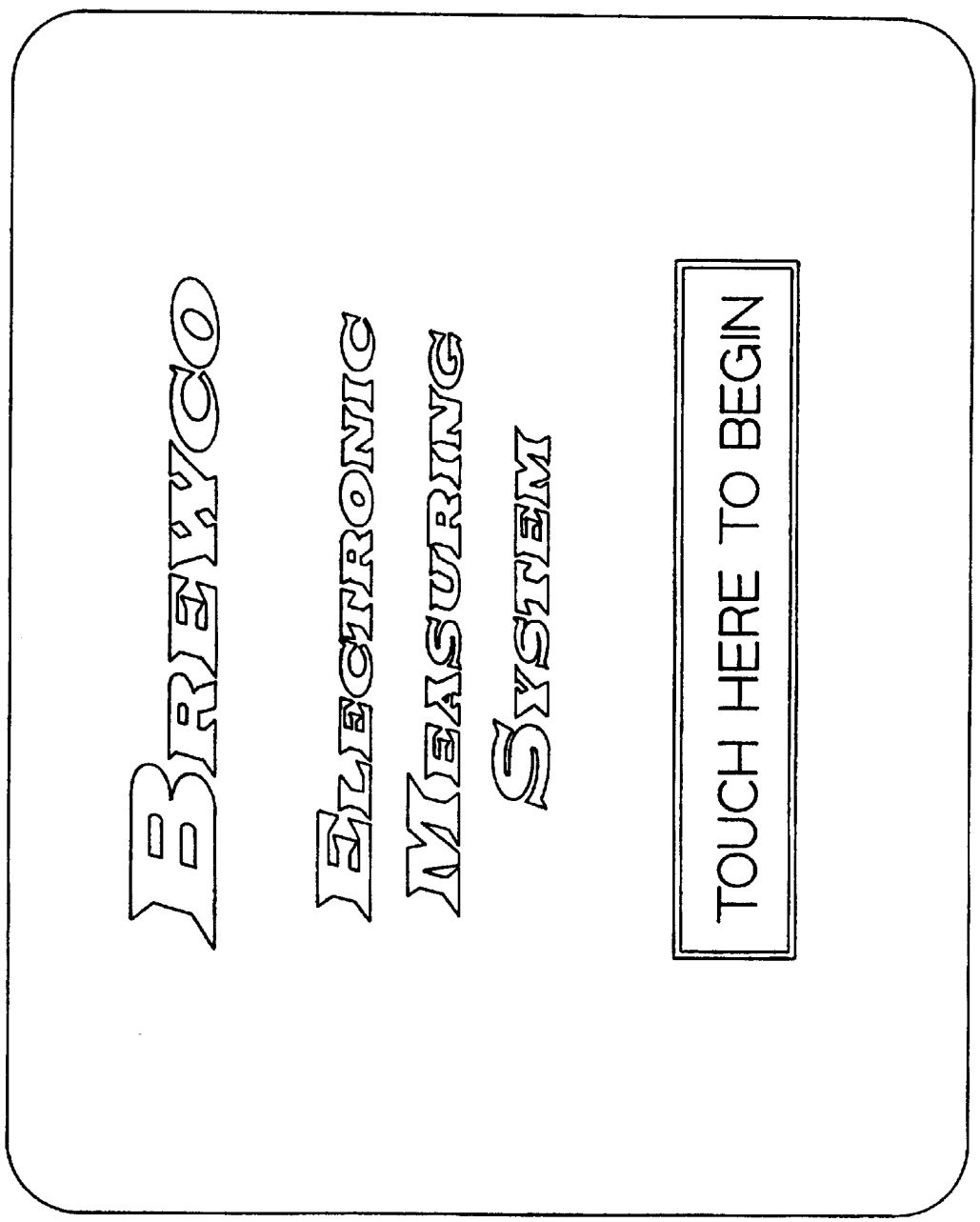
FIG. 18 is a view of the touch screen of FIG. 2 that a user would see when beginning a measurement.

When the device is to be used to measure a vehicle, the user takes the following steps:

First, the user encounters a touch screen 22 similar to that shown in FIG. 18, inviting him to begin the measurement process. The computer 20 asks the user through the touch screen 22 which type of vehicle is being measured. The user touches the screen 22 or uses the keyboard 23 or other user interface to select the make and model of the vehicle to be measured, and the computer 20 then accesses stored, standard measurement data for that type of vehicle 24, showing a standard set of drawings for that type of vehicle, as shown in FIG. 19. Then, if the user is using the embodiment of FIGS. 2 and 2A, the reference frame 12 or 12A is fixed relative to a portion of the vehicle that will not move during the alignment process, preferably by clamping the frame 12 onto the pinchweld of the vehicle.

Then, the user touches the touch screen of FIG. 19 to indicate a known point corresponding to an undamaged portion of the vehicle, and the computer 20 instructs the user which connectors or adapters are to be connected to the probe 18 that is to connect to that known point. The user follows the computer's instructions and inserts the probe 18 into the selected reference hole or otherwise connects the probe 18 to the selected reference point. This process is repeated, as the user, step by step, connects probes 18 to a plurality of reference points on the vehicle.

Then, the camera 16 takes measurements of the emitters 14 on the reference frame 12 and of the emitters 14 on the probes 18 located at known, undamaged reference points. By determining the spatial relationship between the reference frame emitters 14 and the probe emitters 14, and knowing the relationship between the probe emitters 14 and the fixed coordinate system 5 for the vehicle, the computer 20 relates the locations of the emitters 14 of the reference frame 12 to the fixed coordinate system 5 for the vehicle. Thereafter, the probes 18 may remain in place or may be moved to other positions to be measured. The user may then point to the touch screen 22 to select other points to be measured or may use the hand-held probe 18 with the needle point 42 and trigger 43 attached to take measurements of any position on the vehicle for which standard data may not even be available. The trigger 43 is preferably connected to the probe 18 to which the needle tip 42 is connected. The trigger 43 is in the line 36 from the probe 18 to the box 27, and the user may press the trigger 43 whenever he wants a measurement taken using the needle point probe 18. Even if standard data is not available, the user will receive a readout of the three coordinates in the fixed coordinate system 5 for each point being measured, and, by comparing the positions of corresponding points on the left and right sides of the vehicle, which should be symmetrical, may determine how much the damaged side must be moved in order to come into alignment.

Figure 20:
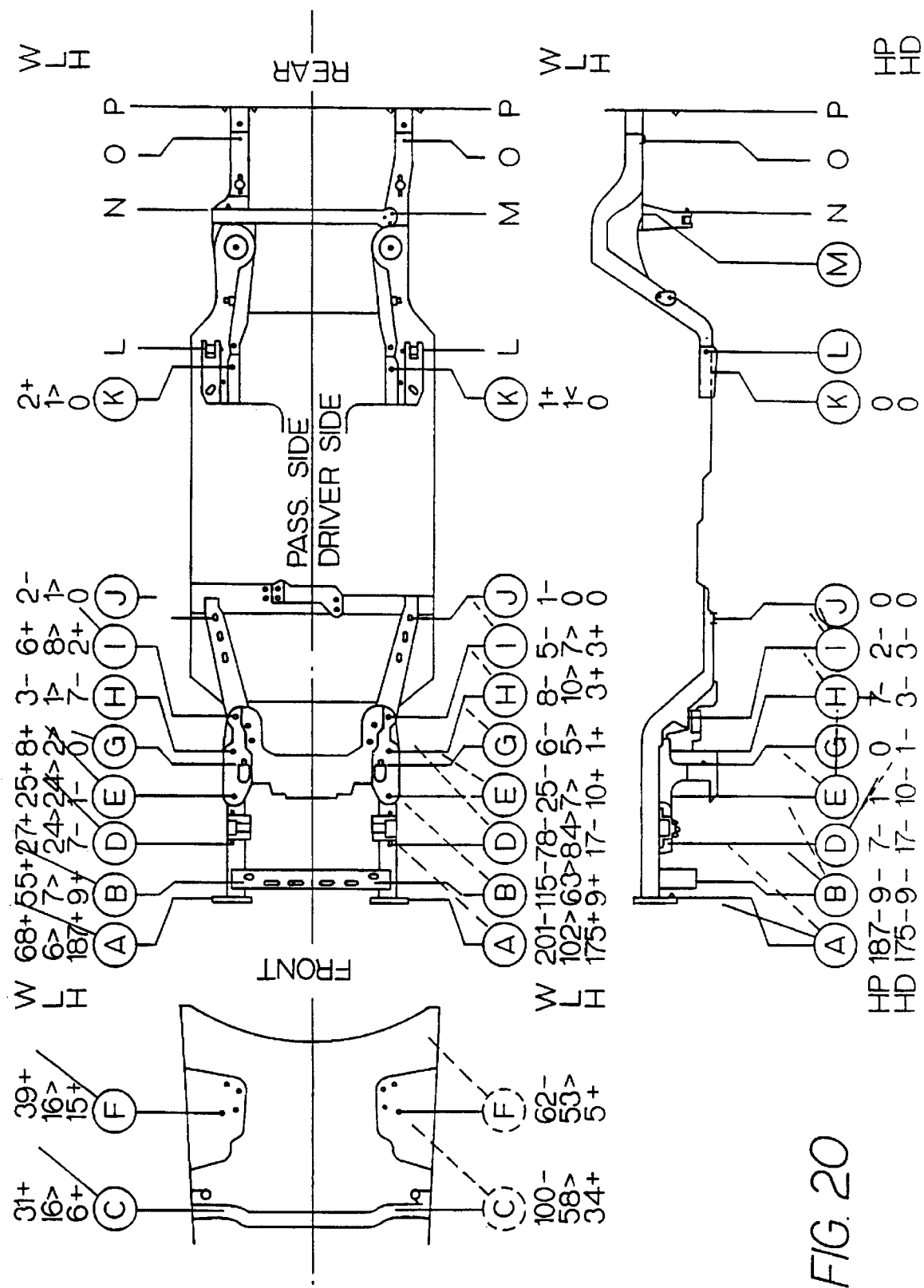
FIG. 20 is a view of the touch screen of FIG. 2 after initial measurements have been made, showing the extent of deviation.

If the user is measuring known points on the vehicle, the screen 22, as shown in FIG. 20, will indicate the extent of the deviation of the measured point from the standard data both with a vector showing the direction and extent of the deviation and with numerical data indicating the extent and direction of the deviation. The vector's length preferably is proportional to the log of the deviation of the measured point from the stored data point, thereby permitting both large and small deviations to be shown graphically. This is very helpful to the user, because it tells him exactly the direction in which movement must take place in order for the vehicle to come into alignment, and it tells him the extent of movement that is necessary. The vectors for the driver's side of the vehicle are displayed in a different color from the vectors for the passenger's side to make the graphics clearer to the user.

This original set of readings may be stored in the computer 20 and may be printed out by the printer 26, to provide an indication of the extent of damage or misalignment before any work is done on the vehicle.

If fixed probes 18 are used to establish a reference frame 12C, as shown in FIG. 2C, the procedure is the same except that the fixed probes 18 or 18C are located in known, undamaged positions on the vehicle which will not move during the alignment process. Then, each time the camera 16 takes a measurement, it establishes a relationship between the newly-measured points and the known emitter 14 locations on the fixed probes 18, enabling the computer 20 to relate the newly measured points to the fixed coordinate system 5.

If individual emitters 14 are used to establish the reference frame 12B, as shown in FIG. 2B, the emitters 14 are affixed onto the vehicle with tape or glue or Velcro® or other fastening means; the camera 16 is moved around the vehicle taking measurements to relate the positions of the emitters 14 to each other; known points are measured with probes 18 and are related to the emitters 14 fixed on the vehicle; and the positions of the fixed emitters 14 are then established relative to the fixed standard coordinate system 5. Thereafter, as new measurements are taken, the camera 16 measures known fixed emitters 14 from the same camera position as it measures new points, thereby permitting the computer 20 relate the new points back to the fixed coordinate system 5.

If the camera 16 is fixed relative to an undamaged portion of the vehicle, as in FIG. 2D, all that is necessary is to use probes 18 to measure some known points on the vehicle, thereby establishing the relationship between the fixed camera 16C and the fixed, standard coordinate system 5, and then, whenever another measurement is taken by the fixed camera 16C, the computer 20 related the position of the new point to the fixed coordinate system 5. The fixed camera 16–16C may be placed at any fixed position from which it can "see" the measurements to be taken.

The strobe rate is fast enough that the sensors 28, 30, 32 can, for all practical purposes, determine the position and orientation of the points being measured instantaneously and communicate that information to the user via the user interface 22. Again, the sensors 28, 30, 32 need only distinguish which of the emitters 14 is illuminated at any one time. In the preferred embodiment of the present invention, this function is accomplished by strobing or energizing the emitters 14 one at a time. Other methods, however, may be used to allow the sensors 28, 30, 32 to distinguish the respective emitters 14 from one another. For example, different wavelengths of electromagnetic energy could be emitted by each emitter, and photodetectors capable of distinguishing those particular frequencies could be used. Alternatively, the respective emitters 14 could be modulated with a unique wave pattern for each emitter 14. The computer 20 could then be programmed to demodulate the unique wave patterns to determine to which particular emitter 14 the position signal belongs. Other methods of distinguishing one emitter source from another are also possible and may be applied to the present invention. However, the simple infrared optic system described herein provides an adequate level of performance. Even if the real image of an emitter 14 is somewhat out of focus, the angular measurement of the image is still usable.

Figure 21:
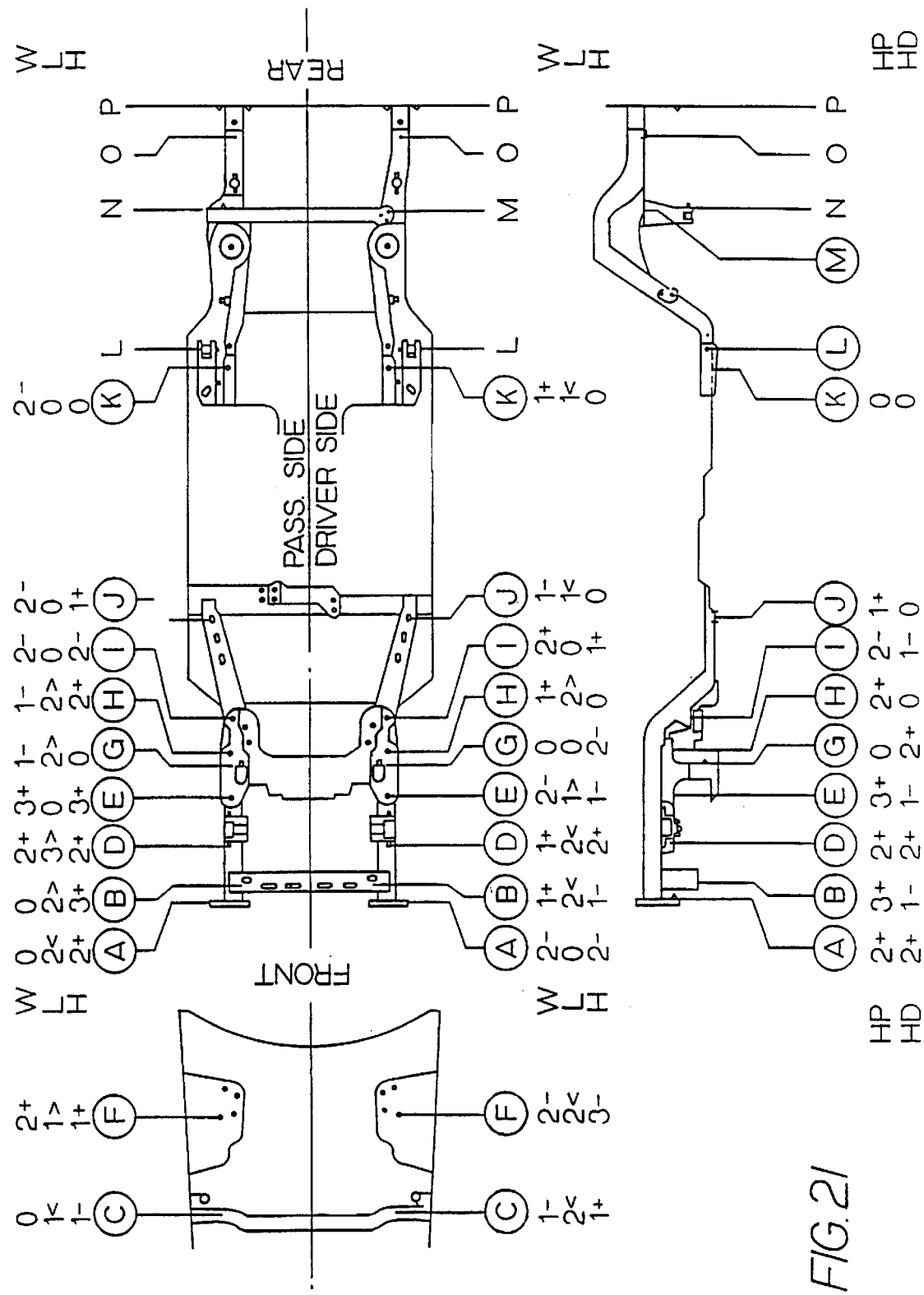
FIG. 21 is a view of the touch screen of FIG. 2 after the vehicle has been straightened, showing very little deviation.

Then, the user begins aligning the vehicle, with probes 18 mounted in points that are being moved in addition to any fixed reference points on the vehicle. As the vehicle comes into alignment, the vectors shrink and disappear, and the numbers on the screen 22 indicating the extent of misalignment go down, until the user reaches a position similar to that shown in FIG. 21. This is the "after" measurement, which again may be stored in the computer and may be printed out as evidence of the extent to which the vehicle has been aligned or straightened.

FIG. 22 shows useful types of measurements that can be taken with the present system, which are difficult or impossible to take with other systems, and which can be taken even if there is not standard data for the points being measured. In this case, the user directs the hand-held probe 18 with the pointing tip 42 to four points 1–4 in the engine compartment and two points 5–6 in the cab of the vehicle. The points 1 and 3, being opposite each other, will have almost identical width, length, and height measurements relative to the coordinate system 5, as will the points 2 and 4, which are also opposite each other. Also, the diagonal distance "a" between points 3 and 4 is identical to the diagonal distance "b" between points 1 and 2. Similarly, the points 5 and 6, being opposite each other, have almost identical readings. It would be very difficult to measure the distance between the points 5 and 6 with standard methods, because the vehicle would get in the way of the measurement, but this type of measurement is very easy with the present invention. FIG. 23 shows the comparative measurements that were taken in FIG. 22, and, indeed, the distances "a" and "b" are identical, and the points that are directly opposite each other have almost identical measurements.

It will be obvious to those skilled in the art that modifications may be made to the embodiments of the invention described above without departing from the scope of the present invention.

What is claimed is:

1. An apparatus for measuring the relative locations of selected points on a vehicle, comprising:
   a plurality of reference emitters, adapted to be fixed relative to the vehicle and to provide reference emitter signals;
   at least one probe moveable to at least one selected point on the vehicle and including at least two probe emitters for providing probe emitter signals;
   a camera, including at least three sensors for receiving said reference emitter signals and said probe emitter signals and for providing reference and probe emitter location data signals; and
   a computer for receiving said reference and probe emitter location data signals and having access to standard vehicle data and for calculating the relative location of said at least one selected point and for comparing the relative location of said at least one selected point to the standard vehicle data.

2. An apparatus as recited in claim 1, wherein said plurality of reference emitters comprise at least a first set of emitters pointed in a first direction and a second set of emitters pointed in a second direction distinct from said first direction and wherein said camera is movable for receiving reference emitter signals from said first set of emitters and said second set of emitters.

3. An apparatus as recited in claim 1 wherein said computer is programmable for determining a deviation of the location of said at least one selected point from a standard location derived from the standard vehicle data and for providing deviation display signals and wherein said apparatus further comprises a visual monitor for receiving said deviation display signals and for providing a graphic representation of said at least one selected point at the standard location and a vector extending from said at least one selected point in a direction of the determined deviation and having a length corresponding to the amount of deviation.

4. An apparatus as recited in claim 1 wherein said at least one probe further includes a probe tip located at a predetermined distance and direction from one of said at least two probe emmitters, said apparatus further comprising data memory, accessible by said computer, that includes relative probe tip and probe emitter location data for different probe types.

5. An apparatus as recited in claim 1, wherein said plurality of reference emitters are mounted on a reference frame in fixed relation to one another.

6. An apparatus as recited in claim 1 further comprising a user interface for receiving user commands and for providing to said computer data signals corresponding to the type of vehicle measured and the location relative to the standard vehicle data of said at least one selected point to be measured.

7. An apparatus as recited in claim 1 further comprising an electrical bus for providing a signal path between said computer and selected of said plurality of reference emitters and said at least two probe emitters, and wherein said computer controls activation of said emitters for providing a selected emitter with an identifiable characteristic.

8. A method for determining the relative shape of an object, comprising the steps of:
   mounting a plurality of reference emitters at fixed locations relative to the object for providing reference emitter signals in at least one direction relative to said object;
   providing probe emitter signals from at least one electromagnetic radiation-emitting probe and positioning said probe at selected points on said object;
   communicating to a computer the standard shape of said object and the locations on said standard shape that correspond to the selected points on said object;
   receiving said reference emitter signals and said probe emitter signals and determining therefrom the relative locations of the selected points on said object;
   calculating the deviation of the determined locations of the selected points on said object from the locations of said selected points relative to said standard shape.

9. A method for determining the relative shape of an object as recited in claim 8, further comprising the step of communicating to a user the direction and amount of deviation of the determined locations of the selected points from the standard locations.

10. A method of measuring the location of a point on a vehicle relative to a standard coordinate system, comprising the steps of:
    providing a plurality of electromagnetic-radiation-emitting reference emitters in fixed relation to the vehicle;
    accessing standard, stored data for the vehicle;
    placing an electromagnetic-radiation-emitting probe at a point on the vehicle;
    sensing the electromagnetic-radiation from the reference emitters and from the probe; and
    relating the location of the probe to the standard, stored data.

11. An apparatus for measuring vehicle body alignment, comprising:

a set of reference emitters positioned at fixed locations relative to a vehicle that are static during vehicle body alignment;

a probe having at least two emitters positionable at an arbitrary point on the vehicle tending to vary in position upon vehicle body alignment;

sensors positionable for viewing the probe and reference emitters and providing corresponding sensor signals; and a computer connected to receive the sensor signals and programmed to compare said signals with reference data to measure body alignment.

12. The apparatus of claim 11 wherein said probe has three emitters and includes a spring clip connector for centering said probe in a standard reference hole on the vehicle frame.

13. The apparatus of claim 11 further comprising:

a reference frame having a first set of reference emitters attached thereto and positioned at a fixed location relative to said vehicle;

a second set of reference emitters fixed to undamaged portions of the vehicle body; and wherein said computer is programmed to determine the relative position of the reference frame to the vehicle based upon the determined relative positional relationship of the first set of reference emitters to the second set of reference emitters.

14. The apparatus of claim 11 wherein said set of reference emitters includes at least three emitters pointed in a first direction and at least three additional reference emitters pointed in a second direction, distinct from said first direction.

15. A method for measuring the deviation of selected points on a vehicle relative to standard dimensions for the vehicle type measured, comprising the steps of:

providing data having standard dimensions for selected points on the vehicle;

positioning reference emitters at fixed locations relative to the vehicle;

affixing probe emitters to a plurality of selected points on the vehicle;

detecting the locations of the probe emitters relative to the reference emitters; and comparing the detected locations of the probe emitters to the standard dimensions for selected points on the vehicle.

* * * * *